(12) United States Patent
Oh et al.

(10) Patent No.: US 10,089,133 B2
(45) Date of Patent: Oct. 2, 2018

(54) APPARATUS AND METHOD FOR VIRTUAL DESKTOP SERVICE SUITABLE FOR USER TERMINAL BASED ON ENVIRONMENTAL PARAMETER

(71) Applicant: ELECTRONICS AND TELECOMMUNICATIONS RESEARCH INSTITUTE, Daejeon (KR)

(72) Inventors: Myeong-Hoon Oh, Daejeon (KR); Dae-Won Kim, Daejeon (KR); Sun-Wook Kim, Hwaseong-si (KR); Jong-Bae Moon, Daejeon (KR); Byeong-Thaek Oh, Daejeon (KR); Soo-Cheol Oh, Daejeon (KR); Jung-Hyun Cho, Daejeon (KR); Seong-Woon Kim, Gyeryong-si (KR); Hag-Young Kim, Daejeon (KR); Ji-Hyeok Choi, Gunpo-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/092,760

(22) Filed: Apr. 7, 2016

(65) Prior Publication Data
US 2016/0378534 A1 Dec. 29, 2016

(30) Foreign Application Priority Data
Jun. 24, 2015 (KR) .................. 10-2015-0089624

(51) Int. Cl.
*G06F 9/455* (2018.01)
*G06F 9/451* (2018.01)
*G06F 8/61* (2018.01)

(52) U.S. Cl.
CPC .......... *G06F 9/45558* (2013.01); *G06F 9/452* (2018.02); *G06F 8/63* (2013.01);
(Continued)

(58) Field of Classification Search
None
See application file for complete search history.

(56) References Cited

U.S. PATENT DOCUMENTS 8,725,886 B1 * 5/2014 Pulier ................... H04L 47/822
709/217
8,732,749 B2 * 5/2014 Hulse .................... G06F 9/4445
715/203

(Continued)

FOREIGN PATENT DOCUMENTS

KR 10-2009-0111576 10/2009
KR 10-2010-0123847 11/2010
(Continued)

OTHER PUBLICATIONS

Casas et al. "Quality of Experience in Remote Virtual Desktop Services", 2013 IEEE, pp. 1352-1357.*
(Continued)

*Primary Examiner* — Van Nguyen
(74) *Attorney, Agent, or Firm* — Kile Park Reed & Houtteman PLLC

(57) ABSTRACT

Disclosed herein are an apparatus and method for virtual desktop service. The apparatus for virtual desktop service includes a connection broker for performing a task for coordinating a delivery protocol that is used between at least one user terminal that uses virtual desktop service and multiple servers that provides the virtual desktop service, a resource pool for providing software resources including an
(Continued)

Operating System (OS) for the virtual desktop service, and virtual machine infrastructure for supporting hardware resources.

8 Claims, 26 Drawing Sheets

(52) U.S. Cl.
CPC .............. *G06F 2009/4557* (2013.01); *G06F 2009/45562* (2013.01)

(56) References Cited

U.S. PATENT DOCUMENTS

| | | | | |
|---|---|---|---|---|
| 8,893,027 | B2* | 11/2014 | Friedl | G06F 9/4445 703/23 |
| 8,954,487 | B2* | 2/2015 | Jung | G06F 15/16 709/202 |
| 9,063,793 | B2* | 6/2015 | Kim | G06F 9/5077 |
| 9,086,897 | B2* | 7/2015 | Oh | G06F 9/4445 |
| 9,489,227 | B2* | 11/2016 | Oh | G06F 9/45533 |
| 9,658,866 | B2* | 5/2017 | Jorgensen | G06F 9/4445 |
| 2010/0168897 | A1* | 7/2010 | August | G05B 19/042 700/105 |
| 2010/0269135 | A1* | 10/2010 | Hulse | G06F 9/4445 725/37 |
| 2010/0325191 | A1 | 12/2010 | Jung et al. | |
| 2012/0166585 | A1* | 6/2012 | Kim | H04L 67/08 709/217 |
| 2013/0007737 | A1 | 1/2013 | Oh et al. | |
| 2014/0214922 | A1* | 7/2014 | Kim | H04L 63/102 709/203 |
| 2014/0366093 | A1* | 12/2014 | Oh | G06F 9/45533 726/3 |
| 2015/0201004 | A1 | 7/2015 | Moon et al. | |
| 2015/0242220 | A1* | 8/2015 | Oh | G06F 9/5027 707/722 |
| 2015/0269187 | A1 | 9/2015 | Cho et al. | |

FOREIGN PATENT DOCUMENTS

| | | |
|---|---|---|
| KR | 10-2010-0138689 | 12/2010 |
| KR | 10-2012-0106778 | 9/2012 |
| KR | 10-2013-0007373 | 1/2013 |
| WO | 2009/108579 | 9/2009 |
| WO | 2011/066472 | 6/2011 |

OTHER PUBLICATIONS

Wang et al. "Research on Virtual Desktop Management based on Cloud Computing", 2015 IEEE, 5 pages.*

Cao et al. "Desktop Workload Characteristics and Their Utility in Optimizing Virtual Machine Placement in Cloud", 2012 IEEE, pp. 333-337.*

* cited by examiner

FIG. 20
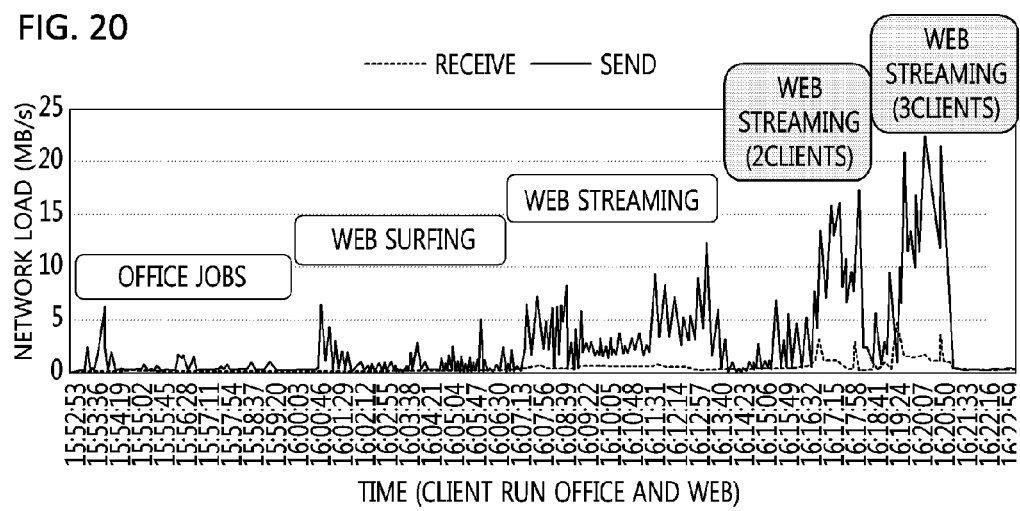
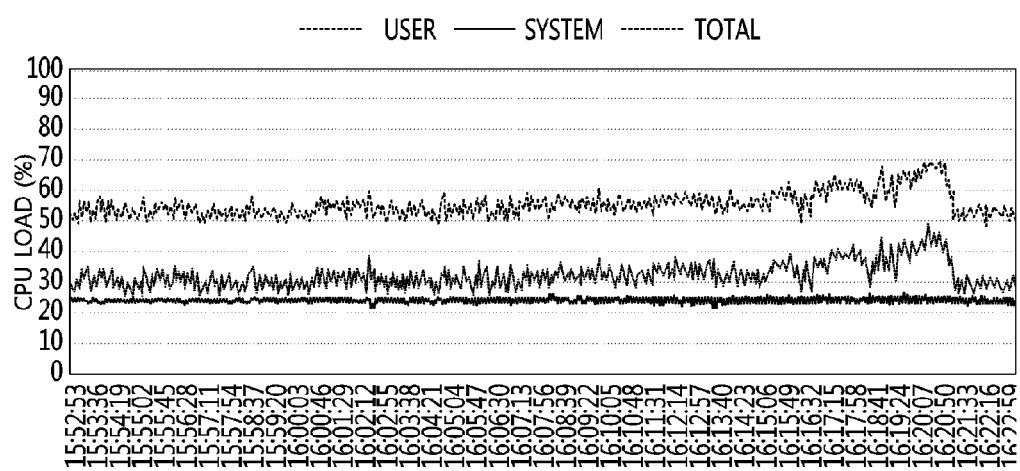

APPARATUS AND METHOD FOR VIRTUAL DESKTOP SERVICE SUITABLE FOR USER TERMINAL BASED ON ENVIRONMENTAL PARAMETER

CROSS REFERENCE TO RELATED APPLICATION

This application claims the benefit of Korean Patent Application No. 10-2015-0089624, filed Jun. 24, 2015, which is hereby incorporated by reference in its entirety into this application.

BACKGROUND OF THE INVENTION

1. Technical Field

The present invention relates to an apparatus and method for virtual desktop service.

2. Description of the Related Art

Recently, there has been a lot of research into and standardization of virtual desktop service, which is service for providing a hard disk for data storage, applications, or the like to an Internet space.

Korean Patent Application Publication Nos. 2010-0123847 and 2009-0111576 disclose virtual desktop service technology in detail. However, architecture for such virtual desktop service has not yet been standardized, and thus there is a limitation in that virtual desktop service cannot be efficiently provided to a user.

Virtual desktop service, which is service in which a hard disk for storing data, application programs, etc. are provided to an Internet space, enables a virtual machine running on a virtual desktop server to be used by connecting the virtual machine to a client system.

When a conventional virtual desktop is provided, there are various schemes, such as a scheme in which Microsoft (MS) provides terminal service called Remote Desktop Connection (RDC) using a Remote Desktop Protocol (RDP), a scheme in which Linux provides terminal service called Virtual Network Computing (VNC) using a Remote Framebuffer (RFB) protocol, and a scheme in which Teradici provides a terminal service solution using a protocol called PC-over-IP (PCoIP).

To perform virtual desktop service using such a conventional scheme, a virtual desktop function must be provided to each user. In order to provide this function, devices (e.g. a Central Processing Unit (CPU), memory, a Hard Disk Drive (HDD), a Universal Serial Bus (USB) device, etc.) corresponding to each user must be allocated to that user, and an OS image for each user must also be allocated.

As public tools for providing such a function, virt-tool, virt-manager, etc. are present. Virtual machines for users may be made and created using a program, such as Citrix XenDesktop, VMware Fusion or Workstation. However, those conventional schemes are disadvantageous in that the user must personally run exclusive software using the OS of a client system, and thus those schemes are not suitable for the provision of real-time virtual service.

In addition, in order to provide the above-described real-time virtual service, the user must access a virtualized desktop environment over the Internet or a Local Area Network (LAN). When a client terminal accesses a virtual desktop using a virtual desktop client program, the network load between a server for providing virtual desktop service (hereinafter also referred to as a "central server" or "provision server") and the client terminal and the CPU load on the server for providing the virtual desktop service may vary depending on the types of tasks executed on the virtual desktop.

SUMMARY OF THE INVENTION

Accordingly, the present invention has been made keeping in mind the above problems occurring in the prior art, and an object of the present invention is to provide architecture that is capable of efficiently providing virtual desktop service.

Another object of the present invention is to provide a method and system for providing a server virtual machine and an apparatus supporting the method, which can create a virtual machine (VM) in real time at the request of a user and can provide real-time virtual desktop service based on the VM.

A further object of the present invention is to provide lightweight protocol technology, which allows virtual desktop service to be satisfactorily used even in a bad network environment.

Yet another object of the present invention is to provide a virtual desktop provision method and a virtual desktop provision server, wherein the virtual desktop provision server for providing virtual desktop service collects information about the network traffic, device specifications, and computing resources of a client terminal in real time from the client terminal, determines environmental parameters for a virtual desktop optimized for the client terminal based on the collected information, and then provides virtual desktop service optimized for the environment of the client terminal.

In accordance with an aspect of the present invention to accomplish the above objects, there is provided an apparatus for virtual desktop service, including a connection broker for performing a task for coordinating a delivery protocol that is used between at least one user terminal that uses virtual desktop service and multiple servers that provides the virtual desktop service; a resource pool for providing software resources including an OS for the virtual desktop service; and virtual machine infrastructure for supporting hardware resources.

In accordance with another aspect of the present invention to accomplish the above objects, there is provided a method for virtual desktop service, including searching, by a connection broker, for a virtual machine suitable for hardware of a user terminal for virtual desktop service; requesting, by the connection broker, virtual machine infrastructure to create a virtual machine when no suitable virtual machine is found, and applying, by the connection broker, a user profile to a found virtual machine and generating a virtual desktop when a suitable virtual machine is found; and transmitting the virtual desktop to the user terminal using a delivery protocol of the virtual desktop.

BRIEF DESCRIPTION OF THE DRAWINGS

The above and other objects, features and advantages of the present invention will be more clearly understood from the following detailed description taken in conjunction with the accompanying drawings, in which:

FIG. 20 is a graph showing network loads between a virtual desktop provision server and the client terminal and CPU loads on the virtual desktop provision server, for respective application programs;

DESCRIPTION OF THE PREFERRED EMBODIMENTS

Figure 1:
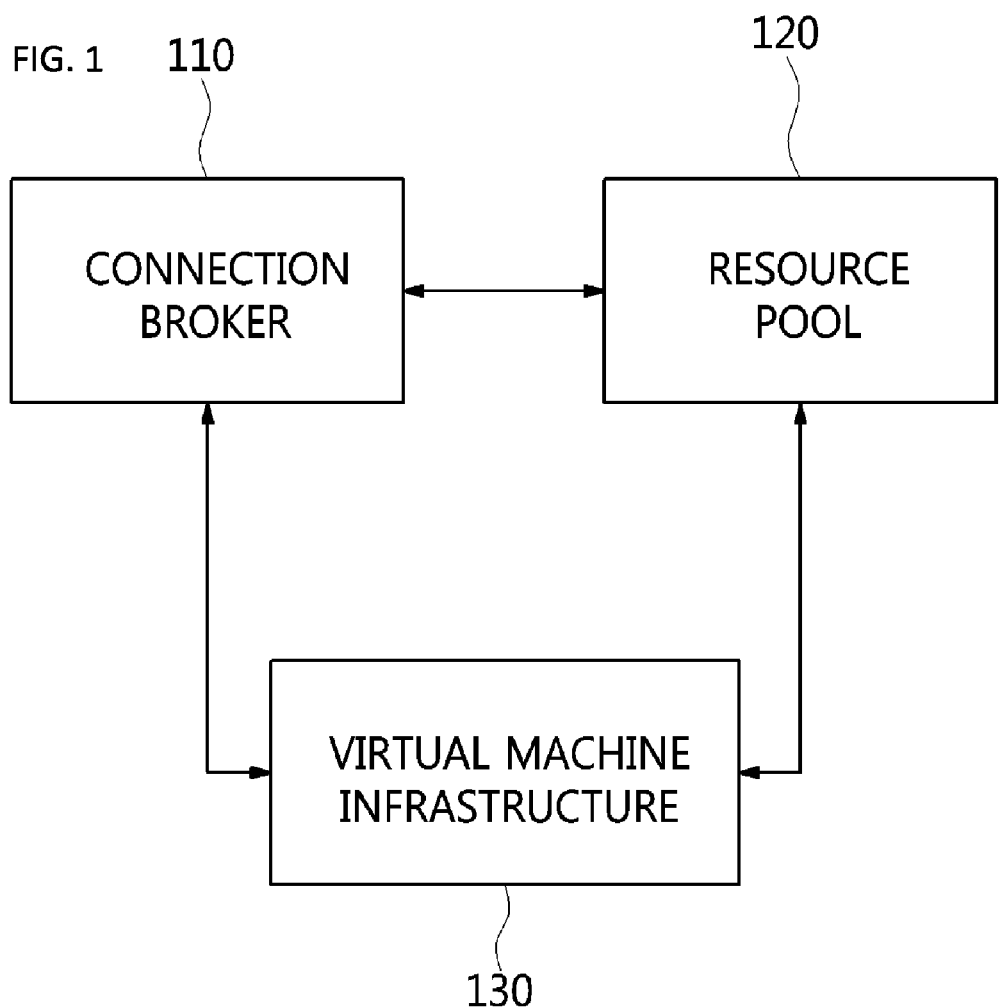
FIG. 1 is a diagram showing service architecture for virtual desktop service according to an embodiment of the present invention.

Embodiments of the present invention are described with reference to the accompanying drawings in order to describe the present invention in detail so that those having ordinary knowledge in the technical field to which the present invention pertains can easily practice the present invention. It should be noted that the same reference numerals are used to designate the same or similar elements throughout the drawings. In the following description of the present invention, detailed descriptions of known functions and configurations which are deemed to make the gist of the present invention obscure will be omitted.

Further, terms such as "first", "second", "A", "B", "(a)", and "(b)" may be used to describe the components of the present invention. These terms are merely used to distinguish relevant components from other components, and the substance, sequence or order of the relevant components is not limited by the terms. It should be understood that a representation indicating that a first component is "linked", "coupled", or "connected" to a second component includes not only the case where the first component is directly coupled or connected to the second component but also cases where a third component is "linked", "coupled" or "connected" between the first and second components.

FIG. 1 is a block diagram showing service architecture for a virtual desktop service according to an embodiment of the present invention.

Several steps are performed in order for a service provider to provide the virtual desktop service to an end-user, and these steps may be performed by three principal actors, namely, a Connection Broker (CB) 110, a Resource Pool (RP) 120, and a Virtual Machine Infrastructure (VMI) 130, as shown in FIG. 1.

Figure 2:
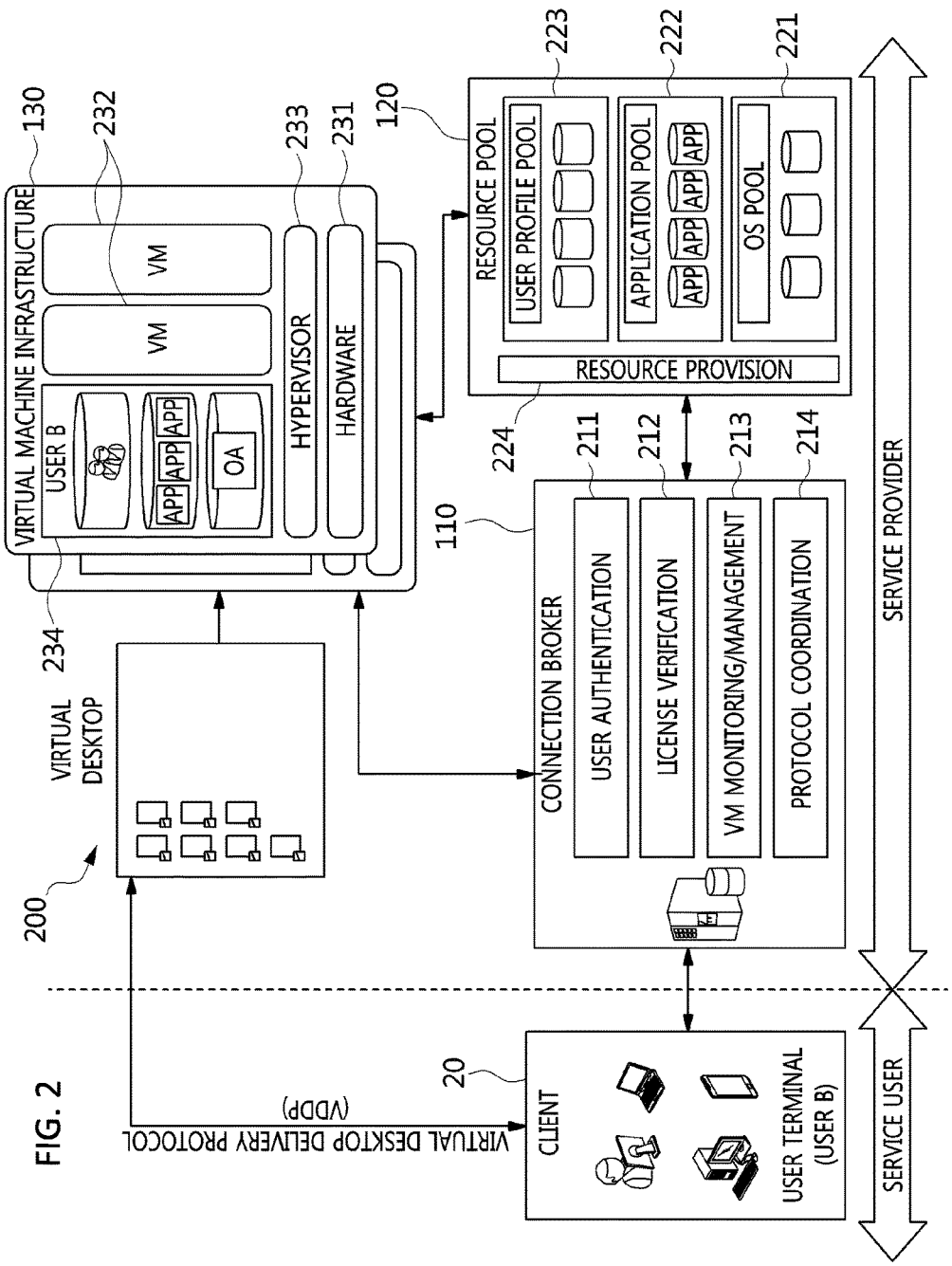
FIG. 2 is a conceptual diagram showing service architecture for virtual desktop service according to an embodiment of the present invention.

Below, the functions of the three principal actors will be described in detail with reference to FIG. 2. FIG. 2 is a conceptual diagram showing service architecture for the virtual desktop service according to an embodiment of the present invention.

Referring to FIG. 2, the connection broker 110 may be a software program enabling a user terminal 20 to be connected to a virtual desktop 200, and may perform a user authentication function 211 and a license verification function 212 for validating the user terminal 20 and the software of the user terminal 20, a management/monitoring function 213 of managing a Virtual Machine (VM) allocated to the user terminal 20 and monitoring a server for measuring the activity level of the virtual machine, and a protocol coordination function 214 for allowing the same protocol to be used between the user terminal 20 and servers. Such a connection broker 110 may provide a connection between backup storage and virtual desktop servers.

Referring to FIG. 2, the resource pool 120 may manage three different types of high-capacity software resources, namely Operating Systems (OSs), applications, and user profiles, in order to provide an on-demand virtual desktop service. That is, as shown in FIG. 2, the resource pool 120 includes an OS pool 221, an application pool 222, and a user profile pool 223. The software resources managed by the resource pool 120 are transferred to a specific virtual machine at a predetermined time in a streaming form and are executed on the specific virtual machine.

Further, the resource pool 120 may provide provision information 224 related to relevant software resources at the request of the connection broker 110. The above-described user profiles may include, for example, individual pieces of information, such as a hardware configuration (for example, a Central Processing Unit (CPU), Random Access Memory (RAM), Input/Output (I/O) devices, etc.), an OS that is used, a selected application, and the user's computing environment information (for example, display resolution, an Internet access scheme, etc.). Such user profiles may be managed for respective users.

Referring to FIG. 2, the virtual machine infrastructure 130 performs the principal functions of supporting hardware resources 231 and creating Virtual Machines (VMs) 232. For virtual desktop servers, a virtualization technology known as a hypervisor 233, for example, is absolutely necessary for the efficient use of the above-described hardware resources 231. The above-described hypervisor 233 abstracts the physical hardware resources 231, and dynamically allocates the physical hardware resources 231 to the higher level of the software 234.

That is, the hardware resources 231 supported by the virtual machine infrastructure 130 may be efficiently used depending on the hypervisor virtualization technology of the virtual desktop servers, which abstracts the physical hardware resources 231 and dynamically allocates them to the higher level of the software 234. Consequently, the virtual machine infrastructure 130 provides the virtual machines 232 in which the software 234 of the user terminal 20 runs. These virtual machines are called virtual desktops 200.

Figure 3:
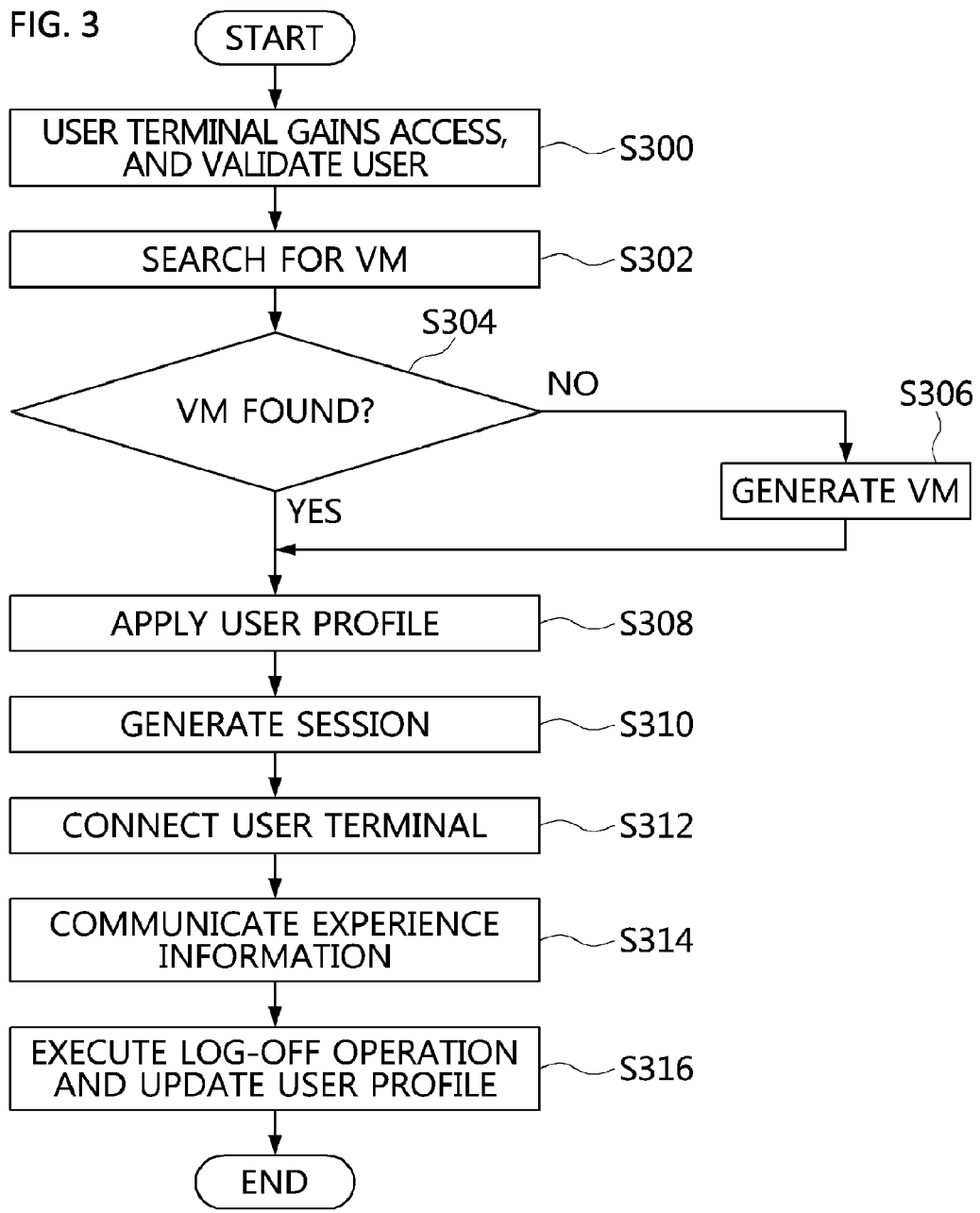
FIG. 3 is a flowchart showing a method for virtual desktop service according to an embodiment of the present invention.

Below, the method for the virtual desktop service will be described in detail with reference to FIG. 3, together with FIG. 2, in which a conceptual diagram of the service architecture for the virtual desktop service is illustrated. FIG. 3 is a flowchart showing the method for the virtual desktop service according to an embodiment of the present invention.

Referring to FIG. 3, the method for the virtual desktop service according to the embodiment of the present invention is performed to include a user terminal connection and user validation step S300, a virtual machine search step S302, a user profile application step S308, a session generation step S310, a user terminal connection step S312, an experience information communication step S314, and a log-off operation and user profile update step S316.

At the user terminal connection and user validation step S300, when the user terminal 20 accesses the virtual desktop service using one or more of the Secure Shell (SSH) and Transport Layer Security (TLS) security protocols, the connection broker 110 validates the relevant user using his or her user Identification (ID) and password. At the virtual machine search step S302, the connection broker 110 identifies the relevant user profile so as to allocate a virtual machine, and searches for a virtual machine that satisfies the hardware configuration of the user terminal 20 and that is optimal for a computing environment, using a provisioning function.

As a result of searching performed at the virtual machine search step S302, whether a suitable virtual machine has been found is determined at step S304. If it is determined that no suitable virtual machine is present, the connection broker 110 requests the virtual machine infrastructure 130 to create a virtual machine by transmitting information about the hardware configuration. Accordingly, the virtual machine infrastructure 130 creates a virtual machine at step S306.

At the user profile application step S308, after the virtual machine has been allocated or created, the connection broker 110 applies the user profile to the allocated or created virtual machine. At the user profile application step S308, the connection broker 110 may install an OS and an application required to construct the virtual desktop 200. At the session generation step S310, the session for which the virtual desktop 200 is to be delivered is initiated in the virtual machine infrastructure 130, and information about the generated session is dispatched to the connection broker 110. At the user terminal connection step S312, the connection broker 110 transmits the session information to the user terminal 20, and the user terminal 20 is connected to the virtual machine infrastructure 130.

At the experience information communication step S314, the user terminal 20 communicates information about the experience of users using the virtual desktop 200 on the basis of a Virtual Desktop Delivery Protocol (VDDP). At the log-off operation and user profile update step S316, the user terminal 20 executes a log-off operation so as to prevent user data from being lost when the virtual desktop service is terminated, and the connection broker 110 updates the changed user profile in the user profile pool 223 during the execution of the log-off operation. Also, at the log-off operation and user profile update step S316, the connection broker 110 may return the relevant virtual machine, thereby making the virtual machine available.

Figure 4:
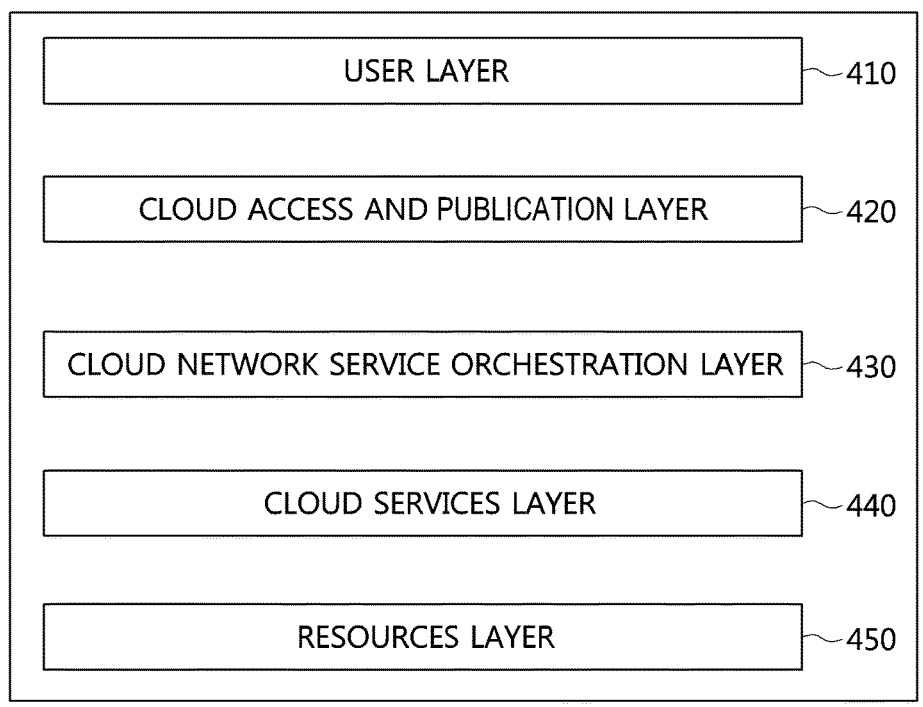
FIG. 4 is a diagram showing functional layered architecture for virtual desktop service according to an embodiment of the present invention.

Below, the functional layers of the virtual desktop service according to an embodiment of the present invention will be described in detail with reference to FIGS. 4 and 5. FIG. 4 is a diagram showing a functional layered architecture for the virtual desktop service according to an embodiment of the present invention.

Referring to FIG. 4, the functional layered architecture for the virtual desktop service according to the embodiment of the present invention includes functional layers such as a user layer 410, a cloud access and publication layer 420, a cloud network service orchestration layer 430, a cloud services layer 440, and a resources layer 450.

The above-described functional layers will be individually described below with reference to FIG. 5. FIG. 5 is a diagram showing the functional layered architecture for the virtual desktop service according to an embodiment of the present invention.

Figure 5:
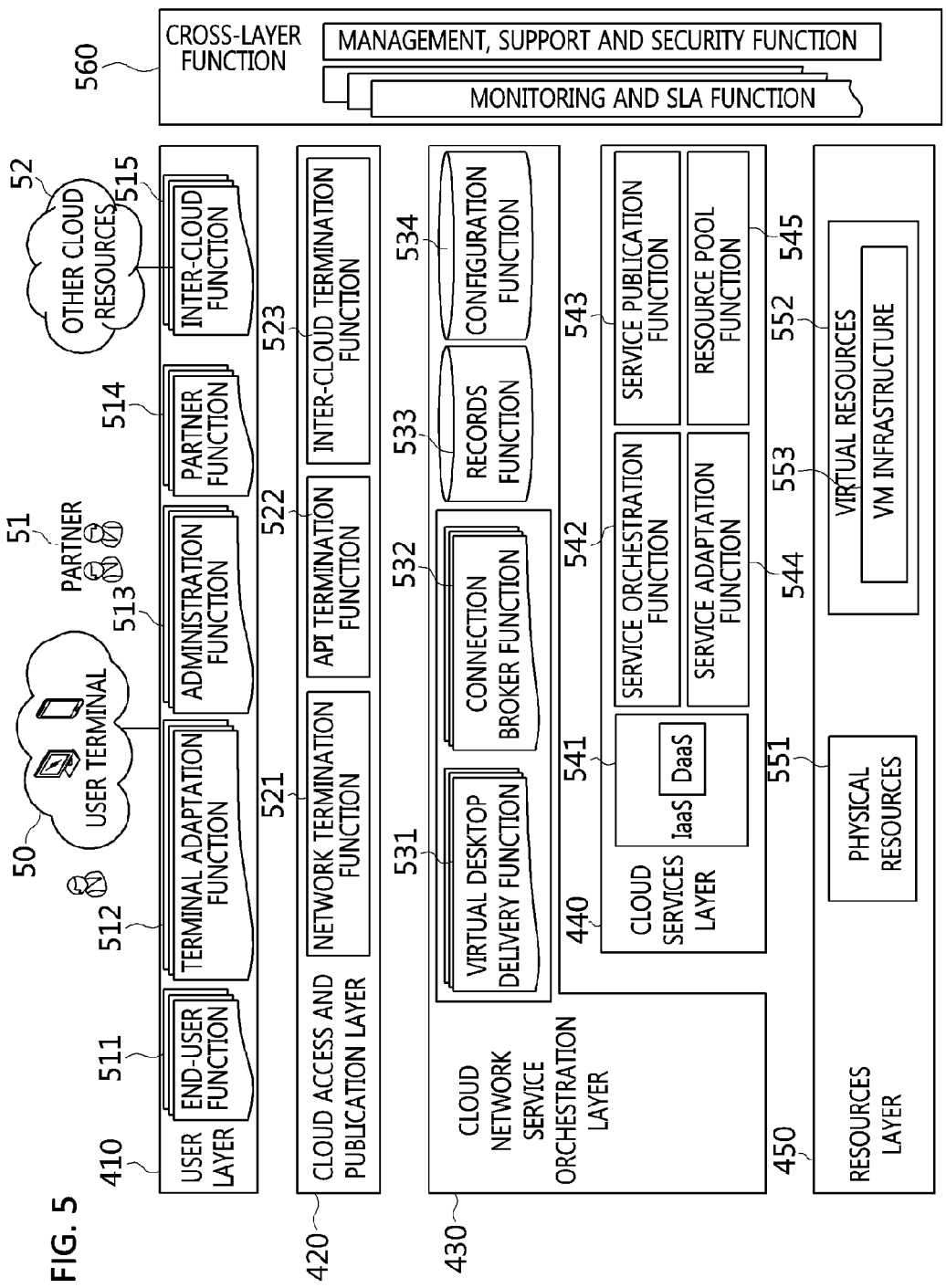
FIG. 5 is a conceptual diagram showing functional layered architecture for a virtual desktop service according to an embodiment of the present invention.

Referring to FIG. 5, the user layer 410 is used to support interactions between the user terminal 50 and the cloud infrastructure, transmit a cloud service request, access the cloud service, and manage or monitor cloud resources, and includes an end-user function 511, a terminal adaptation function 512, an administration function 513, a partner function 514 with partners 51, an inter-cloud function 515, etc.

When receiving the cloud service request, the cloud resource orchestrates its own resources or the resources of other cloud resources using the inter-cloud function 515, and provides the cloud service via the user layer 410. The end-user function 511 supports an end user, that is, the user terminal 50, so that the user terminal 50 accesses and consumes the cloud service. The administration function 513 supports a business administrator in managing cloud resources and services in a business process. The partner function 514 enables a partner relationship to be formed via a Cloud Service Provider (CSP).

The inter-cloud function 515 provides an interconnection interface and broker function so as to interconnect a relevant cloud resource with the cloud resources of a plurality of CSPs. Such an inter-cloud function 515 includes an inter-cloud service broker function, an inter-cloud portal function, etc. The inter-cloud broker function provides an alternative solution to cloud users or applications so as to access the cloud services and resources of other CSPs 52. The user terminal for the virtual desktop service may be any of various types of terminals such as a laptop computer, a desktop PC, a thin client, and a mobile phone. Further, terminal adaptation refers to the function of allowing a terminal device to provide a desktop having a suitable resolution, among various resolutions of different peripherals in different band environments.

Referring to FIG. 5, the cloud access and publication layer 420 provides a common interface to execute manual and automated cloud actions and consumption, grants cloud service consumption requests received from consumers or business processes using cloud Application Programming Interfaces (APIs), which are required to access the services and resources of the Cloud Service Providers (CSPs), and includes a network termination function, an API termination function, an inter-cloud mediation function, etc.

Referring to FIG. 5, the cloud network service orchestration layer 430 includes a virtual desktop delivery function 531 for encapsulating and delivering access to the entire information system environment or access to a remote client device via a network, and a connection broker function 532 including an authentication entity, a coordination entity, a monitoring and management entity, and a verification entity. The authentication entity allows the connection broker to provide approved access in a combination of personalized applications for different security levels by consulting a directory server so as to authenticate a user desktop session. The coordination entity allows the connection broker to perform a coordination function so that after the user desktop session has been authenticated, a common communication protocol for data and video transmission is used between the user terminal and the virtual desktop, in the case where various communication protocols may exist between the user terminal and the virtual desktop. The monitoring and management entity allows the connection broker to perform the actions of monitoring the runtime status of the virtual machine and guaranteeing the operating environment for the required applications. The verification entity allows the connection broker to provide a software license verification function so that the user terminal 50 can access a validated application hosted on the virtual desktop.

In the above-described virtual desktop delivery function 531, the Virtual Desktop Delivery Protocol (VDDP) is the core component of the virtual desktop delivery function 531, and provides a communication channel between the server for Desktop as a Service (DaaS) and the user terminal 50 so as to transfer all pieces of interaction information, for example, information about a display, input, a cursor, control and configuration, and monitoring information.

Further, in the above-described monitoring and management entity, the connection broker commands the virtual machine infrastructure to allocate a new idle virtual machine instance in response to a newly received request, or to allocate a previous instance in response to a request presented by a client-side device after recovery from system failure. Also, the connection broker may request the virtual machine infrastructure to prepare a new cloud virtual machine for a newly logged-in user session (login user session). The above-described cloud network service orchestration layer 430 further includes a records function 533, a configuration function 534, etc.

Referring to FIG. 5, the cloud services layer 440 includes a DaaS function 541 and a resource pool function 545. The DaaS function provides the virtual desktop service to the user terminal 50 via a broadband network. The resource pool function 545 is a broadband resource repository or repository server set in which guest OSs and applications are serialized and stored, and includes a visualized modeling tool which generates a virtual template enabling the cloud virtual machine to be created by the virtual machine infrastructure. The resource pool function 545 has the ability to dynamically assemble the resources required by a currently running virtual desktop, including OSs, application software, user profiles and system configuration, and to produce relevant image files. Further, the resource pool function 545 supports a network-based bootstrap protocol that enables communication with the virtual machine infrastructure and that enables virtual desktops to be remotely generated from the serialized image files. As shown in FIG. 5, the above-described cloud services layer 440 may further include a service orchestration function 542, a service publication function 543, and a service adaptation function 544.

Referring to FIG. 5, the resources layer 450 has physical resources 551 including computing resources, storage resources, network resources, power resources, and other essential facilities in the cloud computing environment, and virtual resources 552 including virtual machines, virtual network resources, and virtual storage resources. The virtual machines are virtual machines created in a virtual machine infrastructure 553 using different server virtualization technologies, such as Xen and a Kernel-based Virtual Machine (KVM). Referring to FIG. 5, the functional layered architecture for the virtual desktop service according to the embodiment of the present invention may further provide a cross-layer function 560 including a monitoring and Service Level Agreement (SLA) function and a management, support and security function.

The above-described virtual machine infrastructure 553 denotes a cluster environment having High Availability (HA) characteristics, and is internally configured such that a large number of running virtual machine instances are generated from the same virtual machine template and are composed of identical parameters. Since almost all virtual machine infrastructures 553 provide virtual machine migration capability, they enable a currently running instance to be migrated to another hosting server in the event of system failure so as to maintain business continuity.

The virtual desktop service described in the present specification may be a service for providing a data storage hard disk or applications to the space of the Internet. In other words, this service may be a desktop service using a virtual machine created by applying desktop virtualization technology, rather than using actual physical hardware for a PC or a desktop for business use. In this case, the created virtual machine for the desktop is located at a remote place, such as in an Internet data center, and can be used in the same way as a local desktop, at any time and from anywhere. The virtual desktop service described in the present specification may be a DaaS service, a cloud computing service, or a cloud desktop service. The architecture for the virtual desktop service according to the embodiment of the present invention (the service architecture and the functional layered architecture) may be the design scheme of the system or server that provides the virtual desktop service to the user terminal, or may be the system or the server itself that provides the virtual desktop service to the user terminal.

Figure 6:
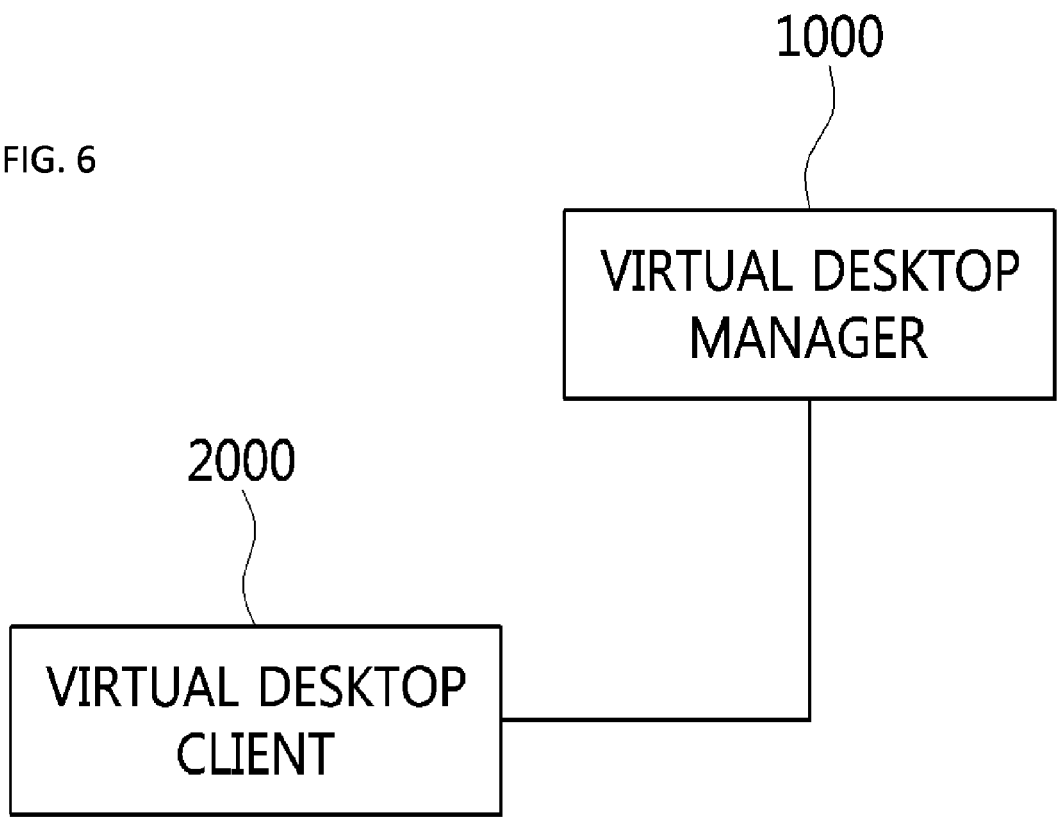
FIG. 6 is a diagram showing the configuration of a desktop virtualization system according to an embodiment of the present invention.

FIG. 6 is a diagram showing the configuration of a desktop virtualization system according to an embodiment of the present invention.

Referring to FIG. 6, a desktop virtualization system (hereinafter also referred to as a "DaaS system") according to an embodiment of the present invention includes a virtual desktop manager device 1000 and a virtual desktop client device 2000.

The virtual desktop manager device 1000 allocates a virtual desktop server to the virtual desktop client device 2000 at the request of a user, and provides functions of controlling the creation, management, termination, and migration of virtual machines. The detailed configurations of the virtual desktop manager device 1000 and the virtual desktop client device 2000 will be described in detail below with reference to FIGS. 7 and 8.

Figure 7:
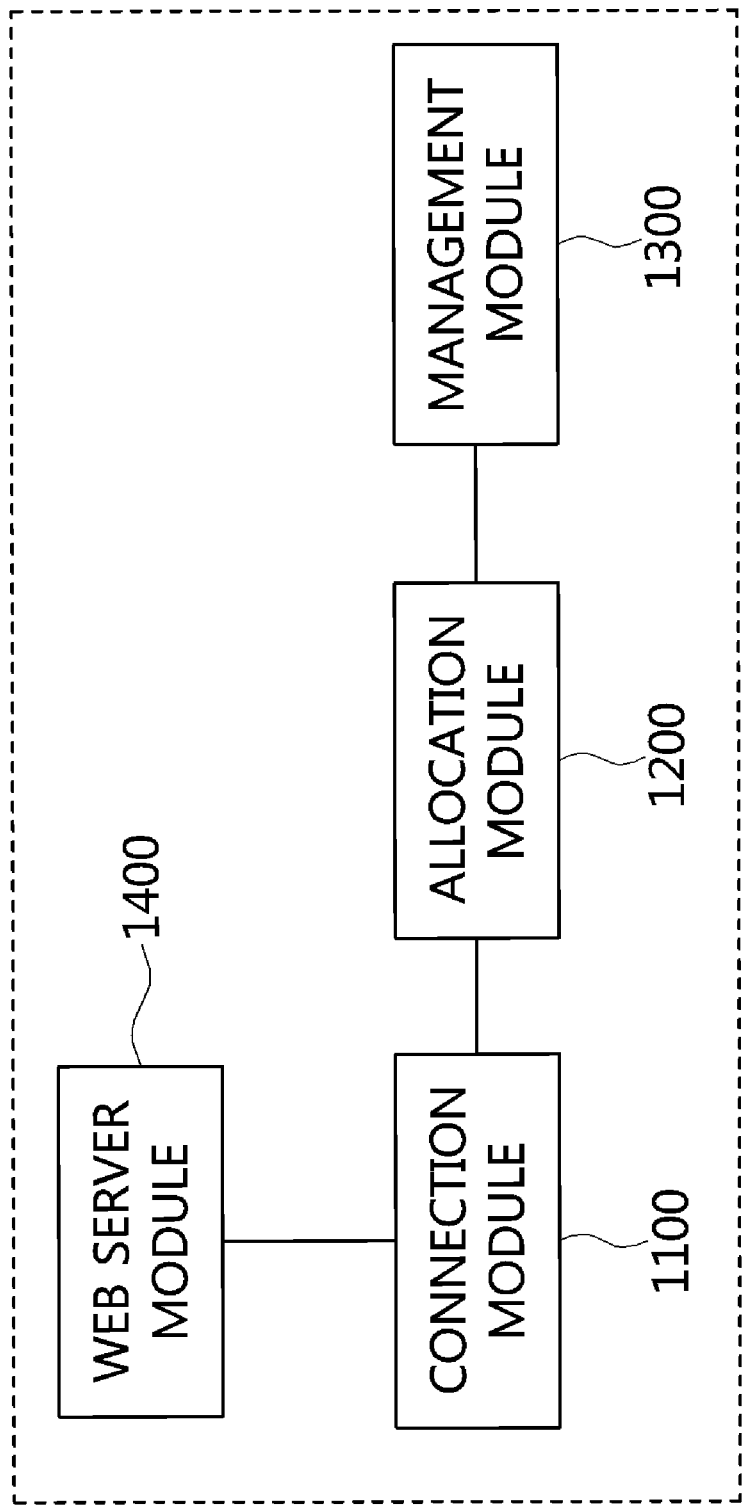
FIG. 7 is a diagram showing a virtual desktop manager device according to an embodiment of the present invention.

FIG. 7 is a diagram showing a virtual desktop manager device according to an embodiment of the present invention.

Referring to FIG. 7, the virtual desktop manager device 1000 according to the embodiment of the present invention includes a connection module 1100, an allocation module 1200, a management module 1300, and a web server module 1400.

The connection module 1100 permits the connection of the virtual desktop client device 2000 of a user who has been authenticated to a virtual desktop server. In order for the user to be remotely provided with virtual desktop service through a DaaS system, the user accesses the connection module 1100 for making a connection to the virtual desktop server. Here, the connection module 1100 permits the allocation of any virtual machine only to the user who accesses the connection module via user authentication, based on information about the request of the user and the virtual machines of virtual desktop servers constituting the current system. Further, after a virtual desktop server has been allocated, the connection module 1100 may provide a connection function for a virtual desktop environment and a screen redirection function using the remote access protocol of the allocated virtual machine. Furthermore, when the use of the allocated virtual machine has been completed by the user, the connection module 1100 may store the current configuration corresponding to the user's account so that the user accesses the connection module again at the time desired by the user, and may delete the virtual desktop connection function and the screen redirection function.

The allocation module 1200 checks the operation states of virtual desktop servers, and then allocates an optimal virtual desktop server to the virtual desktop client device 2000. At this time, the allocation module 1200 may provide a virtual machine provisioning function of monitoring, in real time, information about the use of resources by the virtual desktop servers and the allocation of virtual machines in order to allocate the virtual machine that support the best virtual desktop service to a remote user who requests the virtual desktop service through the connection module 1100. Here, the allocation module 1200 may monitor, in real time, the states of allocation of resources to virtual desktop servers constituting the DaaS system, information about the use of resources by the virtual desktop servers, and information about whether the created virtual machines are being used. Here, the allocation module 1200 provides the best user-customized virtual desktop server to the remote user, and may allocate another virtual machine in real time when a fault occurs in an allocated virtual machine. At this time, the allocation module 1200 may allocate virtual desktop servers by separating an image required to operate virtual machines from the user disk image of the virtual desktop client device 2000.

The management module 1300 monitors the status of operation of virtual desktop servers and virtual machines, and executes control commands from the virtual desktop servers. The web server module 1400 provides a web-based management tool GUI to each user.

Figure 8:
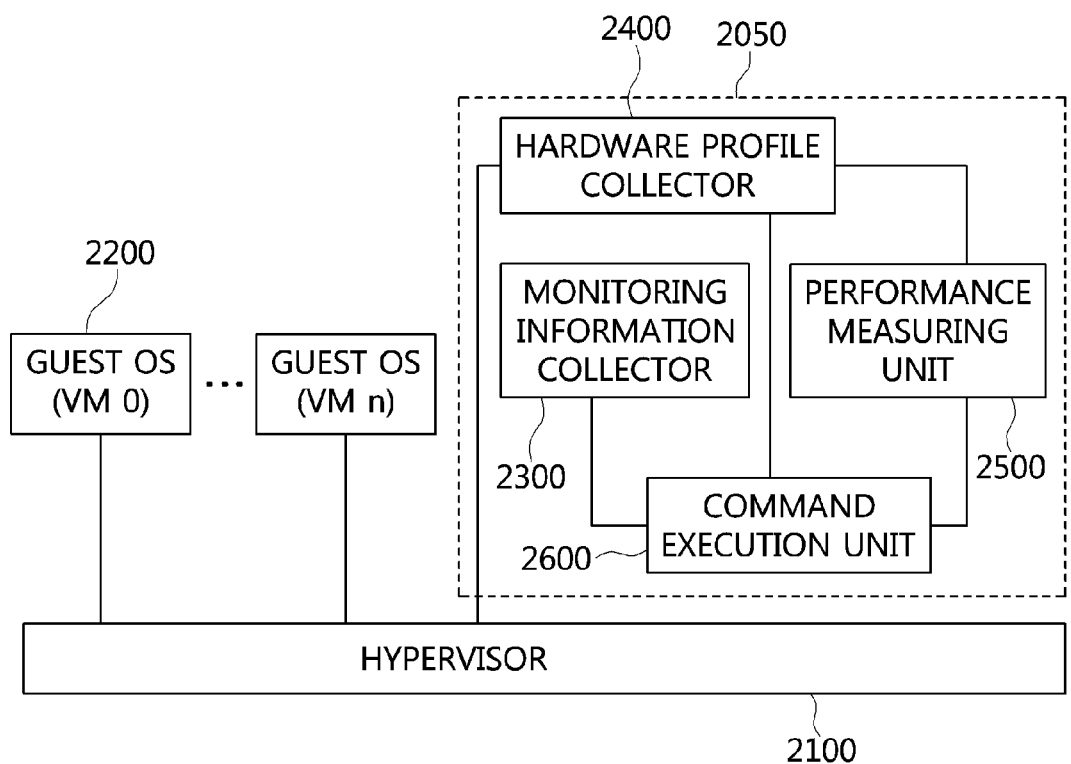
FIG. 8 is a diagram showing a virtual desktop client device according to an embodiment of the present invention.

FIG. 8 is a diagram showing a virtual desktop client device according to an embodiment of the present invention. Referring to FIG. 8, the virtual desktop client device 2000 according to the embodiment of the present invention includes a hypervisor 2100, a monitoring information collector 2300, a hardware profile collector 2400, a performance measuring unit 2500, and a command execution unit 2600. Here, the monitoring information collector 2300, the hardware profile collector 2400, the performance measuring unit 2500, and the command execution unit 2600 may be implemented in a virtual desktop agent 2050.

The hypervisor 2100 accommodates one or more virtual machines 2200 on hardware. The hypervisor 2100 may communicate with the virtual machines 2200 and the components of the virtual desktop agent 2050 using a programmed daemon. Here, the types of virtual machines 2200 may be implemented in full-virtualization or half-virtualization forms. The monitoring information collector 2300 monitors the virtual machines 2200.

The hardware profile collector 2400 collects information about the hardware and OS level of the virtual desktop client device 2000. The performance measuring unit 2500 calculates the performance information of the virtual machine 2200 using the information monitored by the monitoring information collector 2300. The command execution unit 2600 buffers and executes control commands transferred from the virtualization servers. Here, control commands related to the control of virtual machines are processed via a programmed daemon, and commands related to the virtual desktop client device 2000 may be processed at the level of the hypervisor 2100 and OSs.

Meanwhile, as network protocols for the desktop virtualization system, Transmission Control Protocol (TCP)/User Datagram Protocol (UDP) are used, and the method for operating the desktop virtualization system related to management will be described in detail below with reference to FIGS. 9 and 10.

Figure 9:
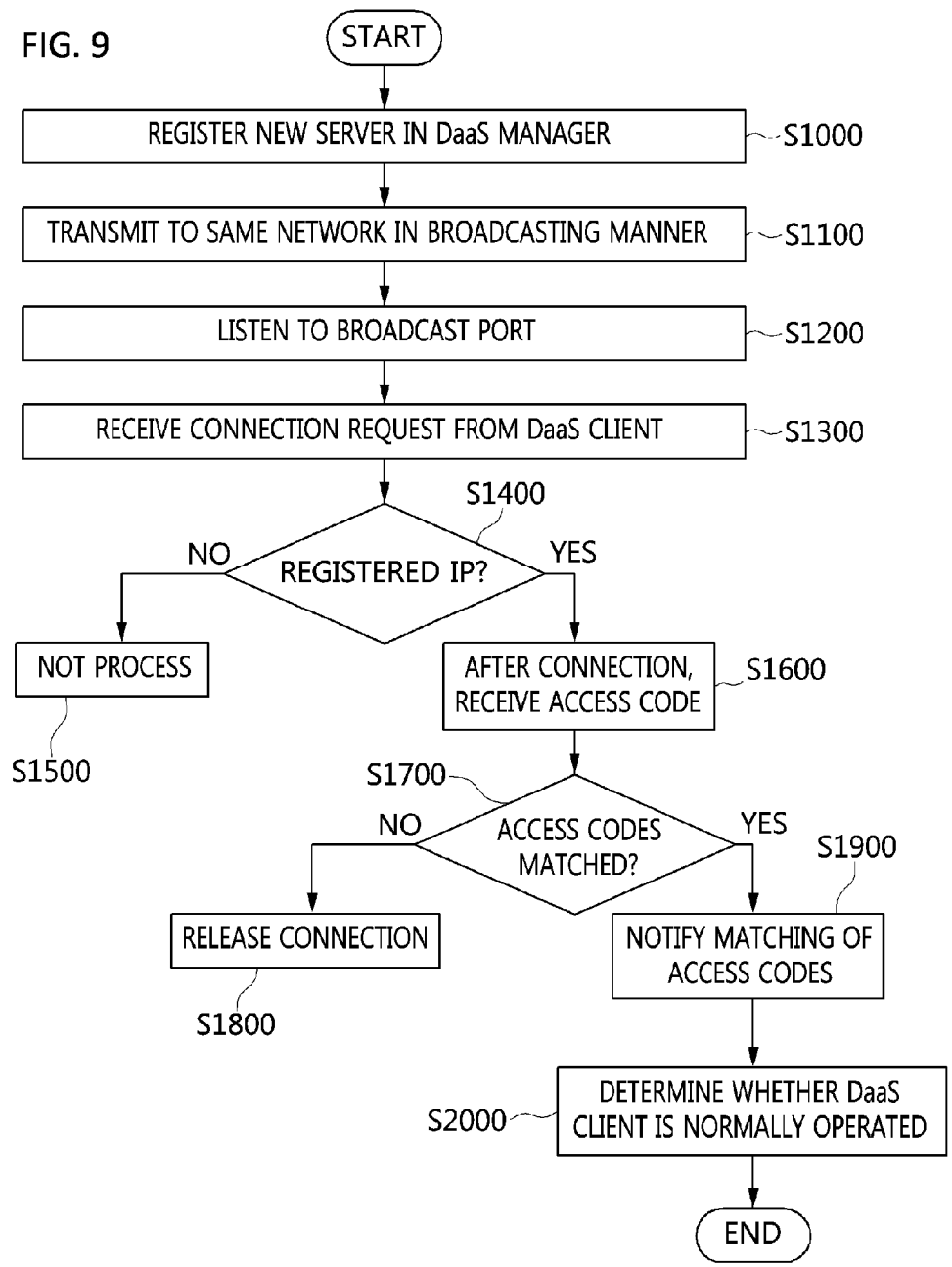
FIG. 9 is a flowchart showing a management method using the virtual desktop manager device according to an embodiment of the present invention.

FIG. 9 is a flowchart showing a management method based on a virtual desktop manager device according to an embodiment of the present invention. Referring to FIG. 9, in the management method based on the virtual desktop manager device according to the embodiment of the present invention, a new server is registered by a user in the virtual desktop manager device 1000 at step S1000.

Meanwhile, a method for registering a new server will be described below. First, the user attempts to access the virtual desktop manager device 1000 on the virtual desktop client device 2000. When the user is a new user, he or she accesses the connection module 1100. Thereafter, the new user is assigned a member ID and a password via a member subscription procedure. The user accesses the virtual desktop manager device 1000 using the assigned access ID, and the virtual desktop manager device 1000 generates a new image. In the case of such a new image, the virtual desktop manager device 1000 selects a preset virtualization image suitable for an existing user pattern, or generates an image by setting the CPU, memory, and HDD desired by the user. Information obtained after the image is generated is stored in the connection module 1100. To perform service, the connection module 1100 requests a redirection function from the management module 1300 using the generated image, and subsequent direct management is continuously performed by the management module 1300.

Thereafter, the virtual desktop manager device 1000 transmits the IP address and the connection port thereof to all servers registered in the same network, in a broadcasting manner at step S1100. Here, in order to transmit information to registered client devices without changing the registered client devices when the IP address of the server of the virtual desktop manager device 1000 is changed, the IP address and connection port of the virtual desktop manager device 1000 may be periodically transmitted or retransmitted at regular intervals when a new server is not connected.

Then, the virtual desktop manager device 1000 is operated by a TCP server and listens to the broadcast port at step S1200. Thereafter, when a connection request message (TCP connection) is received from the virtual desktop client device 2000 at step S1300, it is determined whether the client device has the same IP address as that of a client device registered in the management server at step S1400. When the client device has the IP address of a client device that is not registered, TCP connection is not processed at step S1500. In contrast, when the client device has a registered IP address, an access code is received from the client device at step S1600. Here, the access code may be configured to be changeable via the GUI of the virtual desktop manager device.

Thereafter, the access code transmitted from the virtual desktop client device 2000 is compared with a pre-stored access code, and information about whether the codes match each other is transmitted to the client device that is attempting to gain access at step S1700. Here, the result of transmission of the information about whether access codes match may be transmitted as a resulting value of '1' when the codes match each other, whereas the result may be transmitted as a resulting value of '0' when the codes do not match each other.

Meanwhile, when the access codes do not match each other, a result indicating that the access codes do not match each other is transmitted, and the corresponding connection is released at step S1800. In contrast, when the access codes match each other, a result indicating that the access codes match each other is transmitted at step S1900, and whether the virtual desktop agent of the virtual desktop client device is running normally is determined at step S2000. Here, by means of a separate thread or process, whether to maintain the connection of the virtual desktop agent may be determined. Here, in the case of TCP, the connection may be maintained using a keep-alive function, even if no data is being transmitted.

Figure 10:
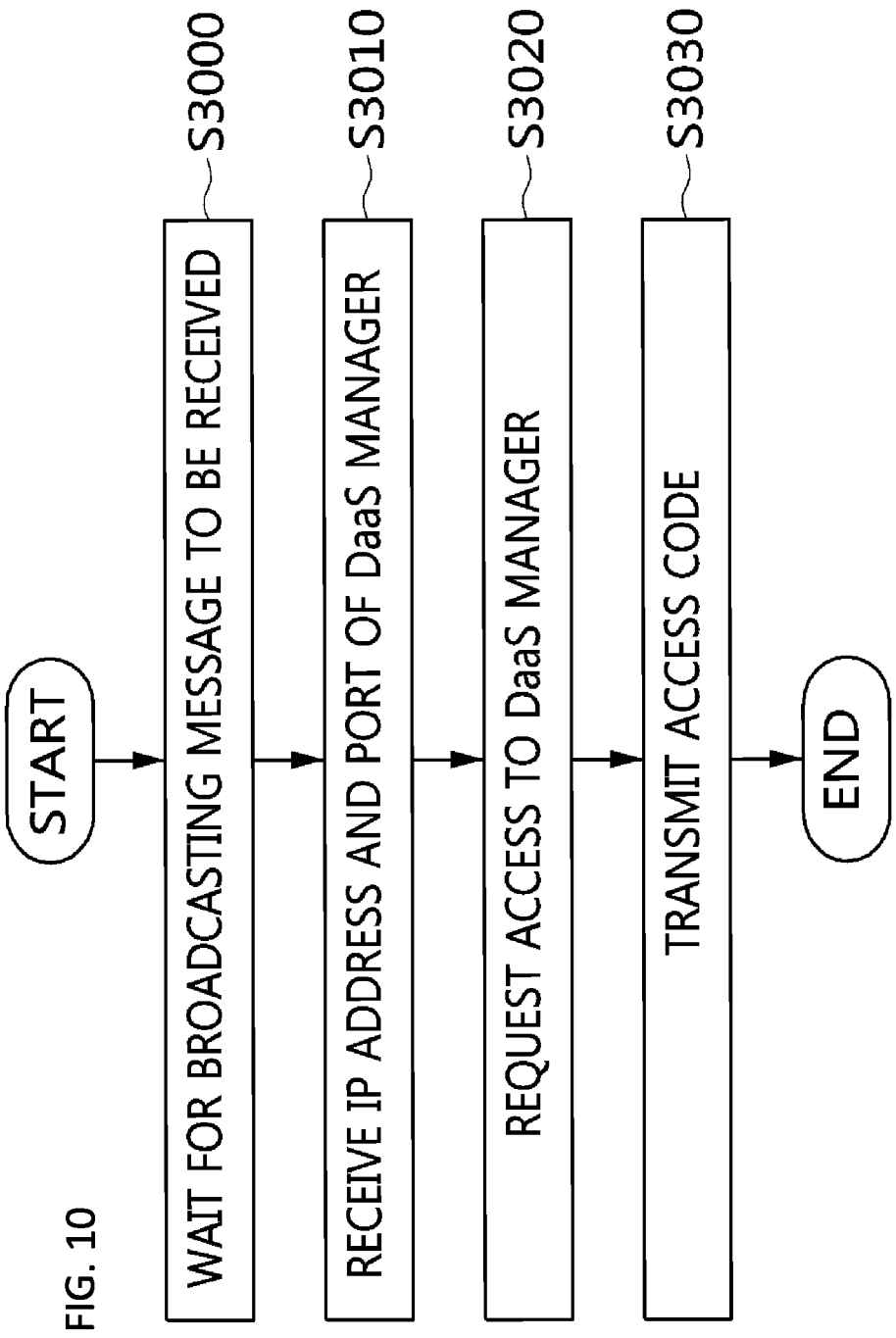
FIG. 10 is a flowchart showing a management method using the virtual desktop client device according to an embodiment of the present invention.

FIG. 10 is a flowchart showing a management method based on a virtual desktop client device according to an embodiment of the present invention.

Referring to FIG. 10, in the management method based on the virtual desktop client device according to the embodiment of the present invention, a virtual desktop agent waits for an IP address and port information to be received from the virtual desktop manager device 1000 when initially operated in order to access the virtual desktop manager device 1000 at step S3000. At this time, when the virtual desktop agent is operated, a broadcast receiver code is initially executed. When the TCP connection is released during the running of the virtual desktop agent after the TCP connection has been set up, the broadcast receiver code may be executed again. Thereafter, the virtual desktop agent receives the IP address and port of the virtual desktop manager device 1000 in a broadcasting manner at step S3010, and requests access to the virtual desktop manager device 1000 using the received IP address and port at step 3020.

Thereafter, when the connection is completed, the virtual desktop agent transmits an access code to the virtual desktop manager device 1000 at step S3030. Here, the access code may be stored as a separate file. Thereafter, the virtual desktop agent waits for the result of processing the access code. When an access error occurs, the connection is released, and thus the virtual desktop agent executes the broadcast receiver code again.

In accordance with the present invention, the user may access the virtual desktop service immediately after power has been applied to the client system. When the virtual machine of the virtual desktop service is terminated, the power of the client is also turned off, and thus an environment is provided in which users may be provided with virtual machine service without being aware of the OS or the virtual desktop client software that are used in order to operate the client.

In accordance with the present invention, a user OS image and a user disk image to be allocated to each user for the virtual desktop service may be promptly provided.

Also, since a prepared disk image is allocated, the number of operations of creating virtual machines and of copying images is reduced, thus greatly reducing the server load in a server virtualization environment.

Figure 11:
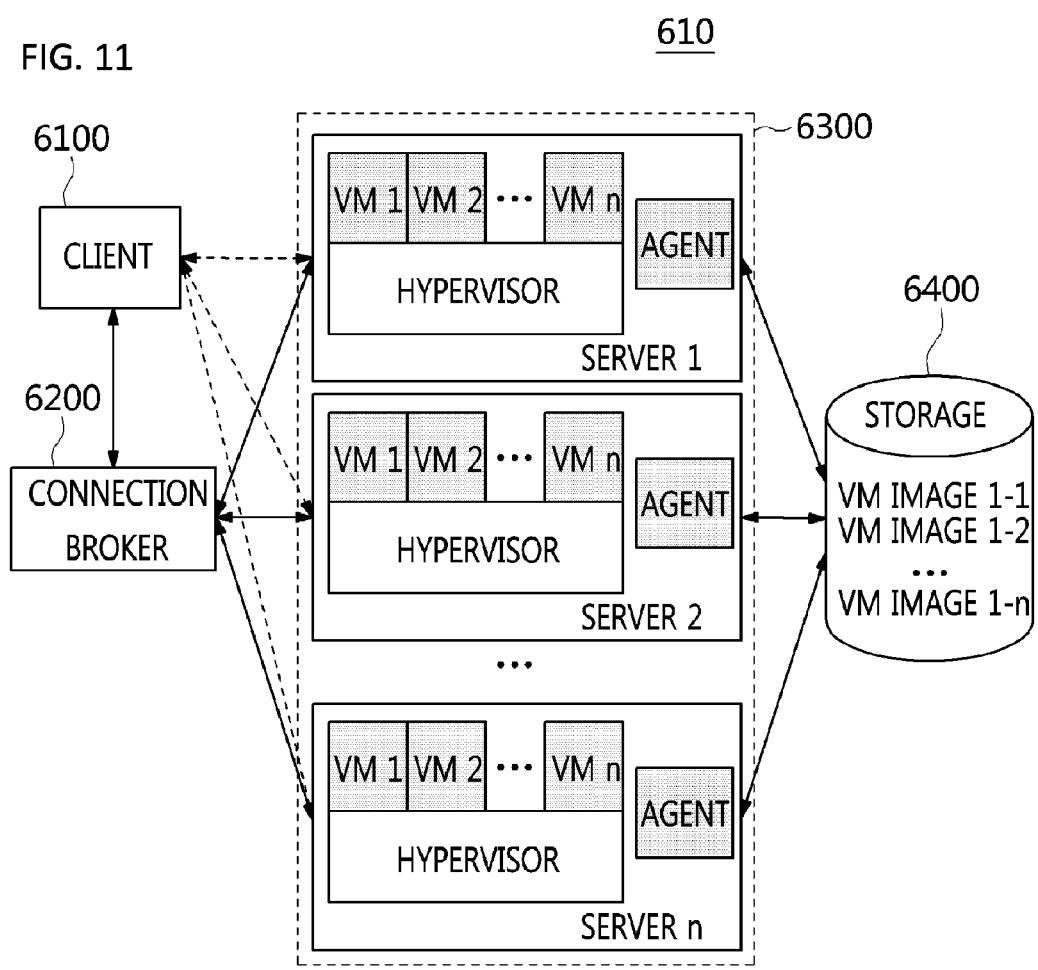
FIG. 11 is a diagram schematically showing a virtual desktop service structure according to an embodiment of the present invention.

FIG. 11 is a diagram schematically showing the structure of server-centered virtual desktop service according to an embodiment of the present invention.

Referring to FIG. 11, a virtual server-centered virtual desktop service structure 610 according to the present invention may be configured to include a client 6100, a connection broker 6200 (hereinafter also referred to as a "management server"), operation servers 6300, and shared storage 6400. Here, the client 6100 may denote one or more user terminals. The client 6100 may select user terminal registration information, such as 'Allocated User', 'Pooled User', or 'Multi-VM User', during the procedure for registering the management server 6200. In this procedure, depending on whether the above-described user terminal registration information is authorized by the manager of the management server 6200, a user request may be accepted or rejected. Alternatively, the form of the user terminal belonging to the client 6100 may be changed by a decision made by the manager during the procedure for registering the management server 6200. Alternatively, the user terminal registration information may be determined according to a previously defined policy. Alternatively, the user terminal registration information may be determined or changed in response to various requests, such as a service type based on the user's selection, in the procedure for registering the client 6100.

As shown in FIG. 11, the virtual desktop service structure 610 according to the present invention provides service in which a client program is installed on the user terminal and in which its own virtual machines (VMs), created on a hypervisor in the virtualization server of a data center or a service provider, may be used using a designated access protocol. To provide VMs to the client 6100 corresponding to the user terminal, user profile information (user information file), a user OS image, and a user disk image are required. The user OS image and the user disk image have a form such that they are shared by the operation servers 6300 using the shared storage 6400. The user profiles may be present in respective operation servers 6300. When a VM use request is received from the client 6100, the management server 6200 may perform task allocation or the like in consideration of user authentication and load distribution. Further, the VM use request may be processed via the agent programs of the operation servers 6300, each having a hypervisor. The operation servers 6300 may return the result of allocation or non-allocation of a VM to the client 6100 as a response to the VM use request depending on the processing of the VM use request.

In the present invention, the operation servers 6300 have the same use profiles for each user terminal, and are configured to share the same OS image and the same disk (storage) with each other. This configuration may support functions for improving availability so that, when one operation server 6300 is interrupted, another operation server 6300 may provide service in place of the operation server 6300 that is interrupted. For this, each operation server 6300 may include at least one VM provided to the client, a hypervisor for supporting the execution of the VM, and an agent for invoking an OS image and a user disk image, which are pre-stored in the shared storage, and supporting the provision of the VM to the client. The agent may support the generation of the OS image and the user disk image related to the client using an image generator, and may perform control such that the OS image and the user disk image are stored in the shared storage.

In the present invention, VMs are allocated by classifying user terminals depending on the method of using VMs so as to support the desktop service. Here, the management server 6200 may classify user terminal registration information into types corresponding to an allocated user (or a dedicated user), a pooled user, and a multi-VM user.

An 'allocated user' is a user who continuously uses a VM allocated (dedicated) to him or her, and permanently has his or her own VM. Basically, allocated users may be divided into users based on a preset or manual scheme. The preset scheme is a method by which a service provider determines the VM environment of the user in advance and provides the VM environment. The manual scheme is a method by which the user may set his or her VM. A 'pooled user' is a user who possesses a VM to be used only once. When a user terminal classified as a 'pooled user' type logs off the operation server, the VM that was used by the user is deleted. When the user accesses the operation server again, a new VM is allocated to the user terminal. When the pooled user disconnects his or her terminal from the operation server, the operation server 6300 does not store the user's personal profile. A 'multi-VM user' is a user designated such that a single user can use multiple VMs.

Figure 12:
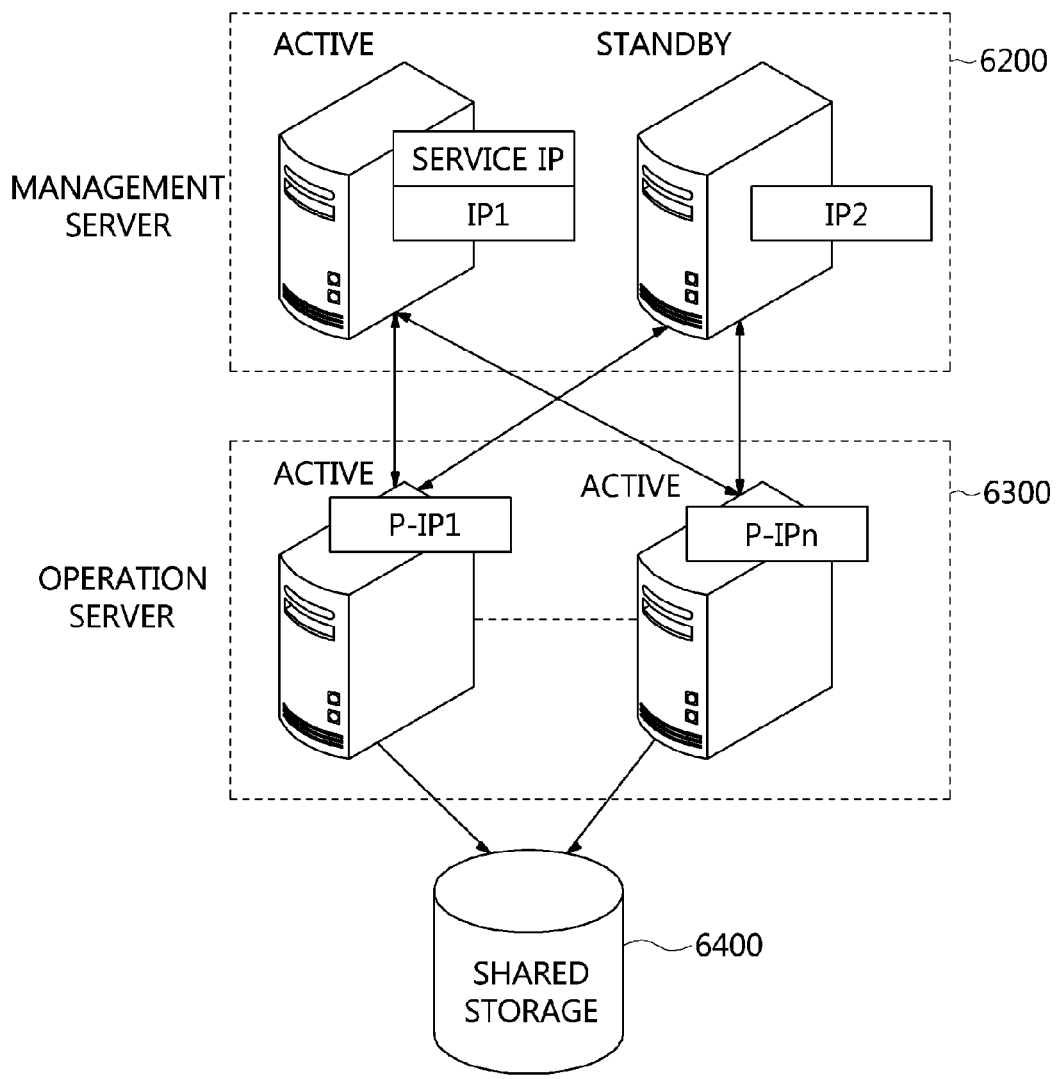
FIG. 12 is a diagram showing server components among all components constituting a server virtual machine provision system for providing a High Availability (HA) server virtual machine according to an embodiment of the present invention.

FIG. 12 is a diagram showing the server components of the overall configuration of a High Availability (HA) server VM provision system according to an embodiment of the present invention.

As shown in FIG. 12, in the server VM provision system of the present invention, the management server 6200 is configured in an active-standby form for HA, and the remaining operation servers 6300 may be configured in an active-active form. The server VM provision system provides cross-validation of the states of the management server 6200 and the operation servers 6300 by clustering all of the servers 6200 and 6300. The server VM provision system according to the present invention supports the operation servers 6300 so that multiple user VMs are distributed to and present in various operation servers (at least two operation servers), rather than locating the user VMs in a single operation server 6300, as described above with reference to FIG. 11. Accordingly, the server VM provision system according to the present invention may seamlessly and continuously provide virtual desktop service by allocating virtual machines from another operation server to the client 6100 corresponding to the user terminal when a failure occurs in the specific operation server from which VMs have been allocated.

Figure 13:
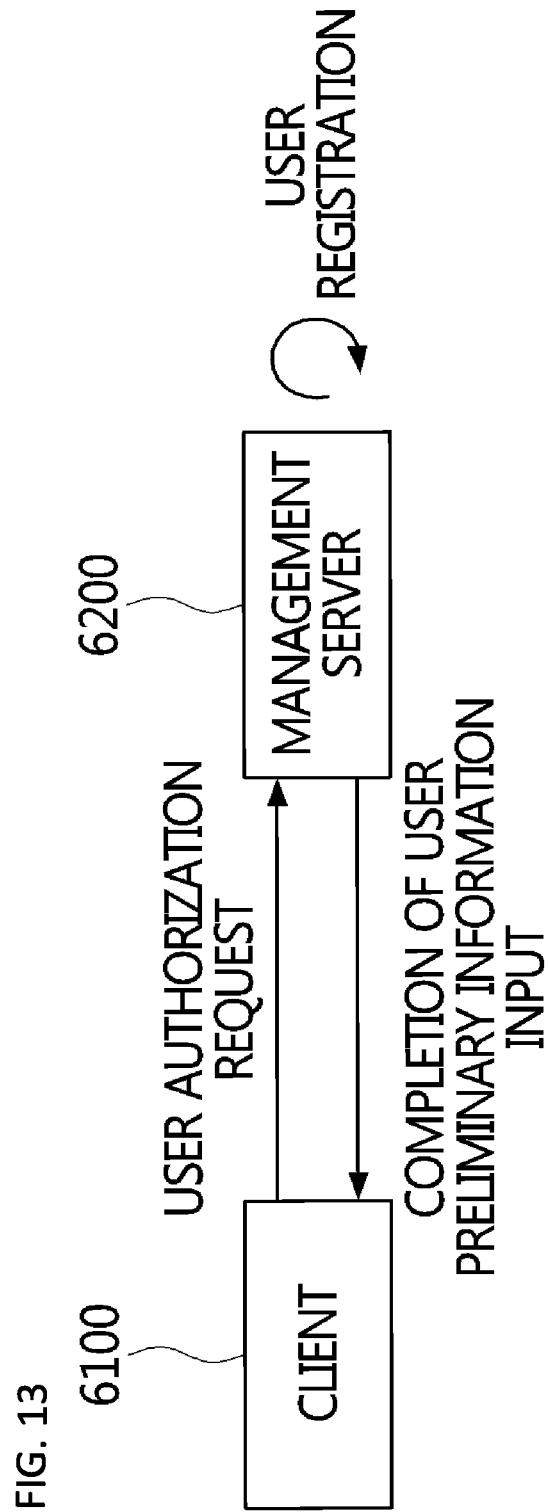
FIG. 13 is a diagram showing user authorization in the virtual desktop service according to an embodiment of the present invention.

FIG. 13 is a diagram showing user authorization in virtual desktop service according to an embodiment of the present invention.

Referring to FIG. 13, the client 6100 corresponding to each user terminal must be authorized to use its own VM in order to operate the virtual desktop service according to the present invention. For this, the client 6100 may access the management server 6200 using a communication module. Next, the client 6100 may enter basic preliminary information for user registration. Here, the client 6100 enters his or her personal information (a name, a unique ID, an address, an email address, a phone number, etc.) required to use VMs, and may then request the allocation of VMs from the service provider, for example, the management server 6200. In this procedure, the client 6100 may use various methods, such as by directly requesting, via a web interface provided by the management server 6200, the provisioning of VMs or by requesting such provision by email. Further, in a typical company, a public institution, etc., user information may be provided at one time to the manager of a service provider, for example, the manager of the management server 6200, without the user terminal directly requesting the provision of VMs. For this, the management server 6200 may support a manager direct registration method that uses a management tool for registering user information at one time.

When the user has been authorized to use VMs, the client 6100 sets its own login ID and password using a web interface or a client program, and performs a procedure for logging in to the management server 6200. Here, when the login ID and password are set, the user terminal may generate a login ID and a password as essential item fields (e.g. a resident registration number, an employee identification number or an ID designated by a service provider). The management server 6200 may perform the procedure for authenticating the information contained in the essential item fields and the login information of the client 6100, based on preset information.

Figure 14:
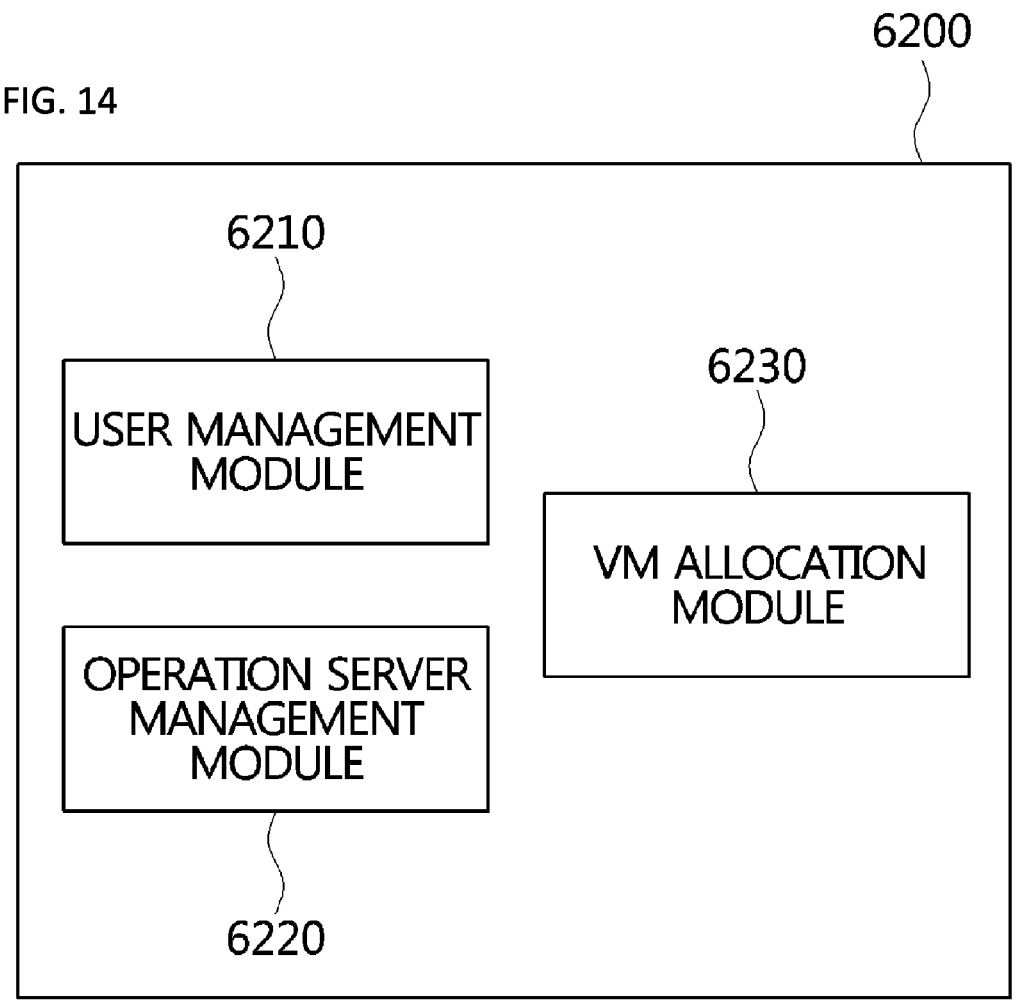
FIG. 14 is a diagram schematically showing the configuration of a management server for supporting virtual desktop service according to an embodiment of the present invention.

FIG. 14 is a diagram schematically showing the configuration of a management server for supporting a virtual desktop service according to an embodiment of the present invention.

Referring to FIG. 14, the management server 6200 of the present invention may include a user management module 6210, an operation server management module 6220, and a VM allocation module 6230.

The user management module 6210 supports access by the client 6100, the registration of user information, etc. The user management module 6210 may establish a communication channel with the client 6100 by controlling the communication module of the management server 6200, and may provide a web page or the like prompting the client 6100 to register user information. Alternatively, when an email or the like in which user information is set forth is received from the client 6100, the user management module 6210 may register the user information by parsing the user information. In this procedure, the user management module 6210 may classify pieces of user terminal registration information for respective clients 6100. For example, the user management module 6210 may classify user terminals into a user terminal for a 'allocated user', to which server VMs are to be semi-permanently allocated, a user terminal for a 'pooled user' to which server VMs are to be allocated, and a user terminal for a 'Multi-VM user' to which server VMs are to be allocated, for respective clients 6100. For this, the user management module 6210 may provide the client 6100 with an item enabling any one of multiple pieces of user terminal registration information to be selected. In this procedure, the user management module 6210 may record the classification of user terminal registration information related to the allocation of server VMs according to a billing policy. When a client 6100 for which a separate item is not selected accesses the user management module 6210, the user management module may classify the user of the corresponding user terminal as a 'pooled user'.

The operation server management module 6220 may manage the states of multiple operation servers. For example, the operation server management module 220 may allocate information about the states of server VMs allocated by the operation servers. Further, the operation server management module 6220 may transfer the information about the states of the operation servers to the VM allocation module 6230. Meanwhile, the operation server management module 6220 may transfer the user terminal registration information provided by the client 6100 to the operation servers.

The VM allocation module 6230 may receive information about access by the client 6100 from the user management module 6210, and may check the user terminal registration information. Further, the VM allocation module 6230 may determine which server VMs are to be allocated, based on the user terminal registration information. For example, the VM allocation module 6230 may determine whether to provide a previously allocated server VM, to provide a temporary server VM, or to provide information about multiple server VMs and provide a selected specific server VM to the client 6100 that has logged in. When the allocation of server VMs has been determined, the VM allocation module 6230 checks the information about the states of the operation servers from the operation server management module 6220. Then, the VM allocation module 6230 may request the allocation of server VMs from at least one operation server depending on the states of the operation servers. Furthermore, the VM allocation module 6230 may receive information about access to server VMs and access permission information thereof from the corresponding operation server, and may transfer the received information to the client 6100. Meanwhile, when the operation server 6300 is designed such that it is capable of directly transmitting the server VM access information and the access permission information to the client 6100, the VM allocation module 6230 may not perform the task of transmitting information related to server VMs.

The VM allocation module 6230 may be involved in the control of OS images and user disk images, which are required in order to provide the VMs of the client 6100. For example, the VM allocation module 6230 may support the control of the operation of image generators that generate OS images and user disk images or the control of a specific operation server 6300 for operating the image generators. Accordingly, the VM allocation module 6230 may control the storage of OS images and user disk images in the shared storage 6400. Information about the positions of the OS images and the user disk images in the shared storage 6400 may be provided to the operation server 6300 so that the OS images and the user disk images may be used in a procedure in which the operation server 6300 provides VMs. When the operation server 6300 is directly involved in the generation and storage of OS images and user disk images, a function related to the image generators may be omitted from the VM allocation module 6230.

Figure 15:
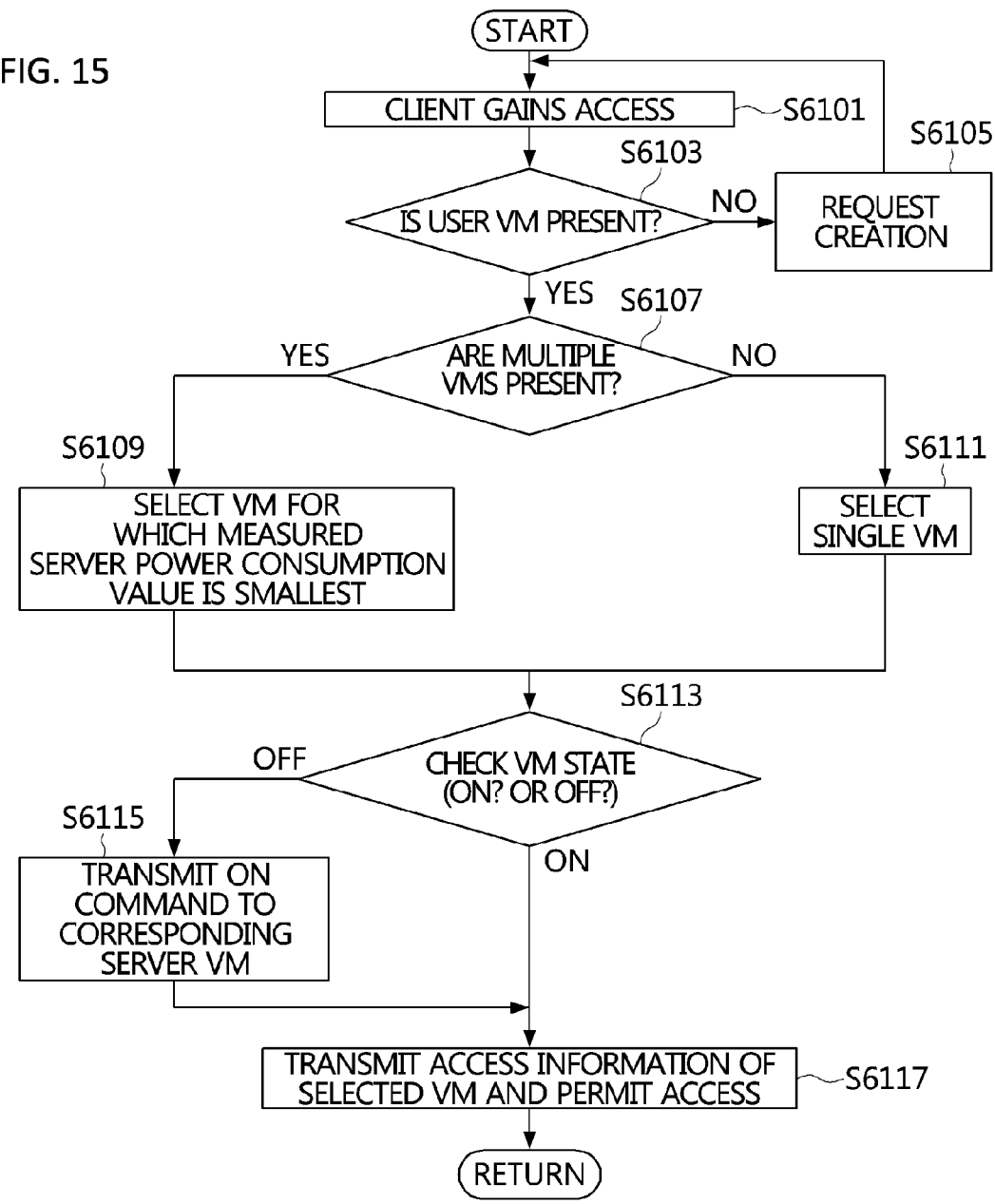
FIG. 15 is a diagram showing the creation and allocation of a virtual machine for an allocated user type in the virtual desktop service according to an embodiment of the present invention.

FIG. 15 is a diagram showing the creation and allocation of a VM for an 'allocated user' in the virtual desktop service according to an embodiment of the present invention. In FIG. 15, when the client 6100 performs an initial login procedure, the management server 6200 may perform a procedure for checking which user terminal registration information the client 6100 has and determining which VMs are to be allocated based on the checked information.

Referring to FIG. 15, when the client 6100 accesses the management server 6200 at step S6101, the management server 6200 checks the user terminal registration information of the client, and may perform a procedure for generating and allocating server VMs for the client 6100 when the user terminal registration information contains information about an allocated user. For this, when the client 6100 corresponding to the allocated user accesses and logs in to the management server 6200, the management server 6200 may determine whether there is a user VM allocated to the client at step S6103.

When no user VM is allocated to the client 6100, the process of the management server 6200 branches to the step S6105 of requesting the client 6100 to create a VM. For this, the management server 6200 may send a VM creation request message to the client 6100 using a webpage, a message, or the like. Then, the client 6100 performs a procedure for creating a VM, either in conformity with the characteristics of the user terminal or in response to the user request. Here, when the creation of the VM fails, the client 6100 may perform the operation by requesting the creation of a VM from the manager of the management server 6200. When the creation of the VM has been completed, information about the created VM is stored in a DB. When the client 6100 logs in to the management server 6200 using the value stored in the DB, the management server 6200 may determine again whether the user VM of the client 6100 is present. As described above with reference to FIGS. 11 and 12, each management server 6200 and each operation server 6300 may constitute a type of system that supports both a load distribution function, in which multiple identical VMs are present, and a failover (failure overcoming) function.

Meanwhile, when a user VM is present at step S6103, the process of the management server 6200 may branch to the step S6107 of determining whether multiple VMs are allocated to the client 6100. Here, when there are multiple VMs, the process of the management server 6200 branches to the step S6109 of performing control such that the VM for which a measured server power consumption value is smallest is selected from among the multiple VMs. For this operation, the management server 6200 may check the characteristics of operation servers and may perform control such that the operation server having better data processing characteristics is selected. In contrast, when a single VM is allocated to the client 6100 at step S6107, the process of the management server 6200 may branch to the step S6111 of performing control such that the single VM is selected.

Next, the management server 6200 may check the state of the selected VM and determine whether the selected VM is in an ON state or an OFF state at step S6113. When the selected VM is in an OFF state, the process of the management server 6200 may branch to the step S6115 of transmitting an ON command to the corresponding server VM. Thereafter, the process of the management server 6200 may branch to the step S6117 of supporting access so that information about access to the selected VM is transmitted to the client 6100 while access permission information is transmitted to the client 6100.

Figure 16:
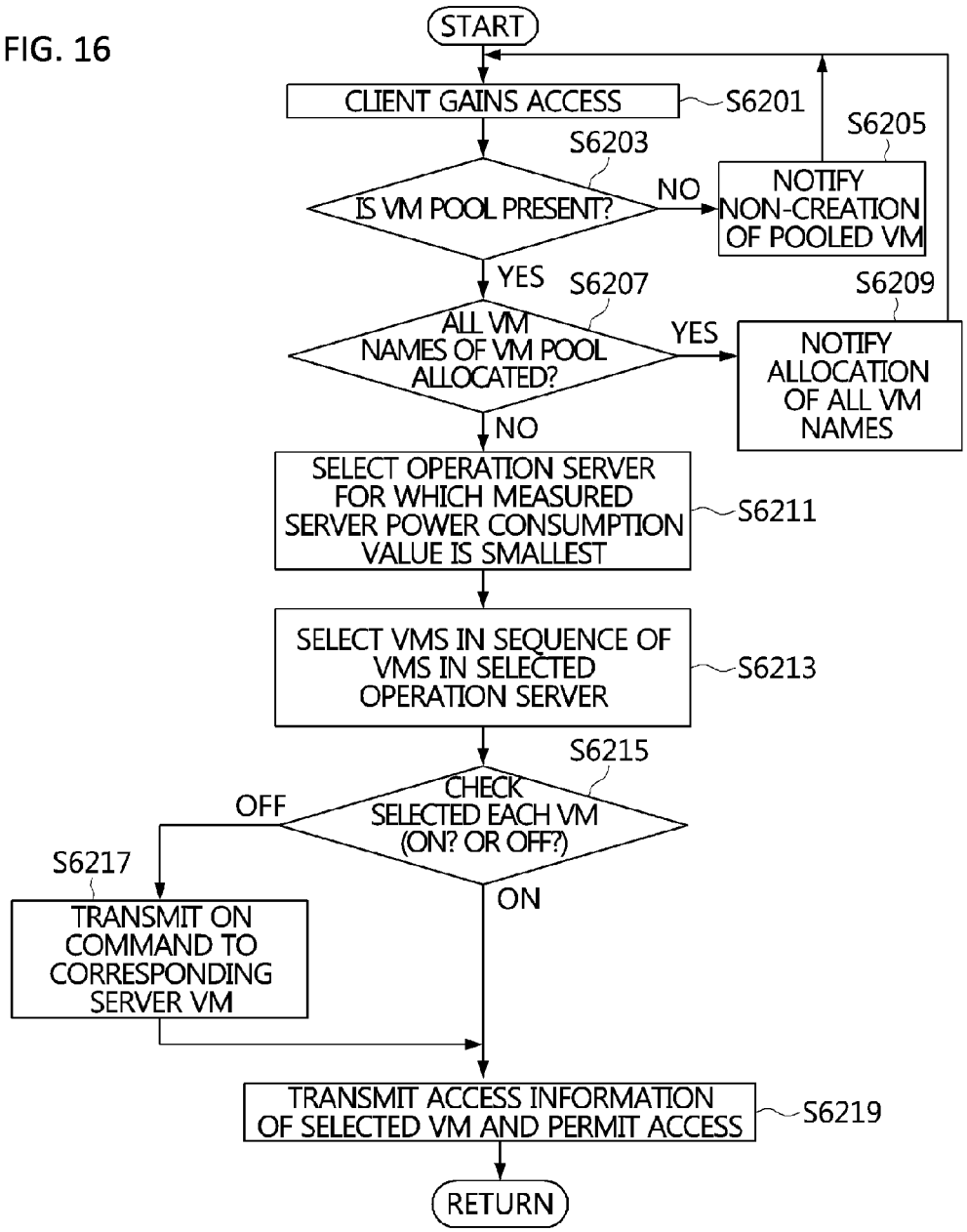
FIG. 16 is a diagram showing the creation and allocation of a virtual machine for a pooled user type in the virtual desktop service according to an embodiment of the present invention.

FIG. 16 is a diagram showing the creation and allocation of a VM for a pooled user in the virtual desktop service according to an embodiment of the present invention.

Referring to FIG. 16, when a client accesses the management server 6200 at step S6201, user terminal registration information may be checked by utilizing login information that is acquired when the client accesses the manager server 6200. Further, when the user terminal registration information is the 'pooled user' type, the management server 6200 determines that a VM allocated to the client 6100 is not present, and branches to the step S6203 of determining whether there is a VM pool.

When there is no VM pool at step S6203, the process of the management server 6200 may branch to the step S6205 of notifying the client 6100 that a pooled VM is not been created. Then, the client 6100 may undergo a series of procedures for requesting the creation of a VM pool using any of various schemes such as access to a web interface or sending an email, and performing operations for the request so as to use server VM service. The client 6100 may access the management server 6200 again after the VM pool creation procedure has been completed.

When there is a VM pool at step S6203, the process of the management server 6200 may branch the step S6207 of checking whether all VM names in the VM pool have been allocated. Further, when all VM names in the VM pool have already been allocated, the process of the management server 6200 may branch to the step S6209 of notifying the client 6100 having requested the allocation of VMs that all VMs have been allocated. That is, the management server 6200 may inform the client 6100 that there is no VM to be allocated. Here, the management server 6200 may provide information about the expected waiting time to the client 6100 based on experimentally obtained statistical information or the like.

Meanwhile, when not all VM names in the VM pool have been allocated at step S6207, that is, when there is a VM name that is allocable to the client 6100, the process of the management server 6200 may branch to the step S6211 of selecting the operation server, for which the smallest server power consumption value is measured, from among the operation servers belonging to the VM Pool. Further, the management server 6200 may select VMs to be allocated in the sequence of VMs included in the selected operation server at step S6213. Thereafter, the management server 6200 may check the state of each selected VM at step S6215. When the VM is in an OFF state, the process may branch to the step S6217 of transmitting an ON command to the corresponding server VM. The management server 6200 may transmit information about access to the selected VM and the access permission information to the client 6100 at step S6219.

The above-described management server 6200 according to the present invention supports the allocation of VMs so that a temporarily available VM may be allocated from the VM pool to a pooled user. In the present invention, the VM belonging to the VM pool is implemented as a VM that was previously created by the operation server 6300 under the control of the management server 6200, and thus a function of creating a VM at the request of the client 6100 is not supported.

Figure 17:
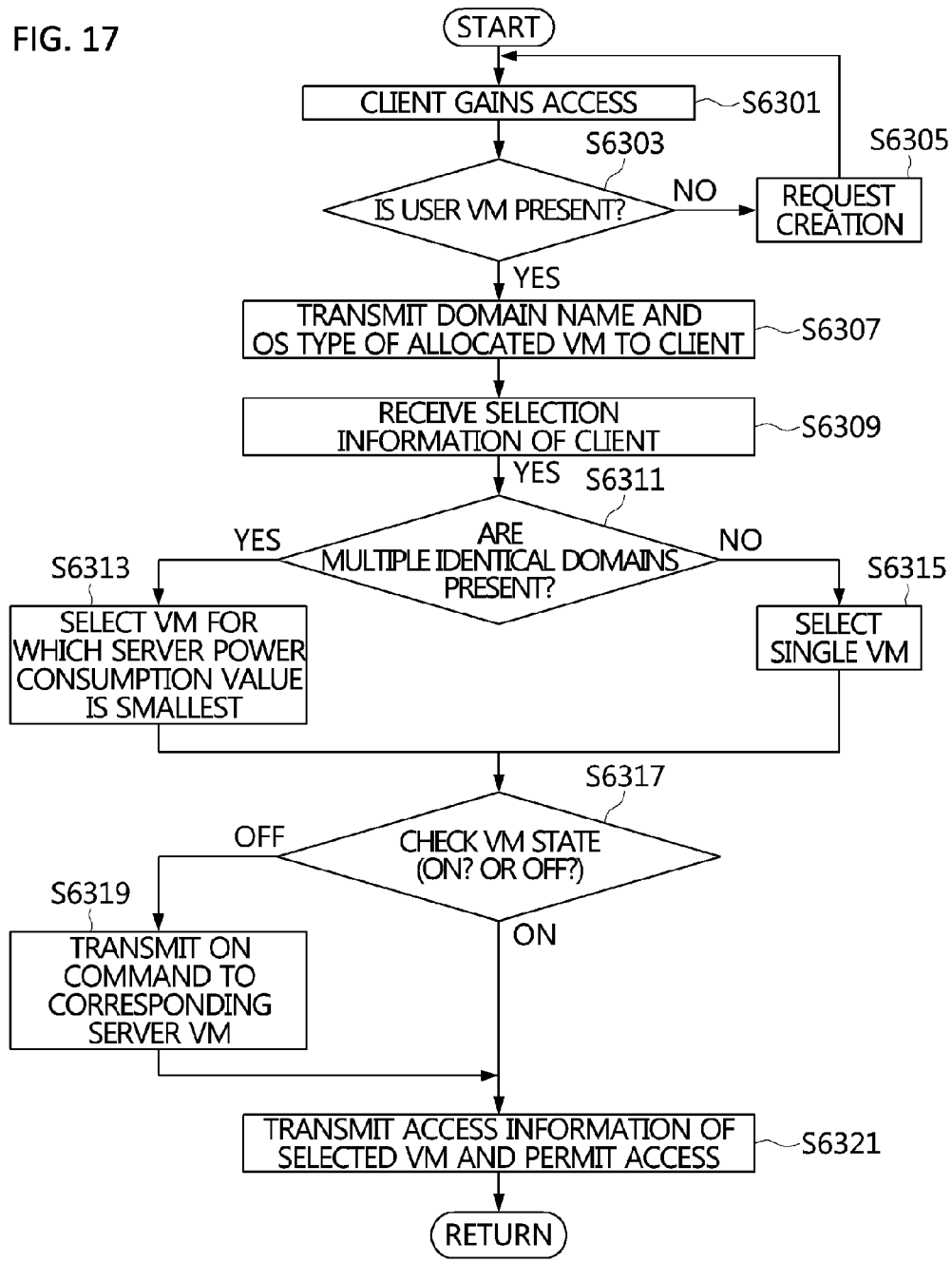
FIG. 17 is a diagram showing the creation and allocation of a virtual machine for a multi-VM user type in the virtual desktop service according to an embodiment of the present invention.

FIG. 17 is a diagram showing the creation and allocation of a VM for a multi-VM user in the virtual desktop service according to an embodiment of the present invention.

Referring to FIG. 17, in order to provide a virtual desktop service according to the present invention, the management server 6200 may support the processing of access by a client at step S6301. The client 6100 may perform a login procedure when accessing the management server 6200. In this procedure, the management server 6200 may identify that the client is a multi-VM user by checking user terminal registration information, and may determine whether there is any user VM allocated to the client 6100 at step S6303. When there is no user VM, the management server 6200 may transmit a user VM creation request to the client 6100 at step S6305. Then, the client 6100 may perform a process for creating a user VM using one of various schemes such as access to a web interface or sending an email. In contrast, when there is a user VM at step S6303, the management server 6200 may transmit the domain name and OS type of the allocated user VM to the client at step S6307. Depending on the user terminal registration information that is the 'multi-VM user' type, the client 6100 may have multiple VMs that are allocated. Accordingly, the management server 6200 transmits information about all VMs allocated to the client 6100. For this, the management server 6200 may collect and manage information about the allocation states of VMs by the operation servers 6300.

Thereafter, the management server 6200 may receive information about the VM selected by the client 6100 at step S6309. In this procedure, the client 6100 may transmit information about the selection of the VM, desired to access thereby, from among multiple VMs provided by the management server 6200, to the management server 6200. The management server 6200 may determine whether there are multiple identical domains at step S6311. When there are multiple identical domains, the process of the management server 6200 may branch to the step S6313 of selecting a VM in the domain in which server power consumption is lowest from among the multiple domains. In contrast, when there is a single identical domain, the management server 6200 may select a single VM at step S6315. Thereafter, the management server 6200 may check the state of the selected VM at step S6317. When the VM is in an OFF state, the process may branch to the step S6319 of transmitting an ON command to the corresponding server VM. The management server 6200 may transmit access information and access permission information for the selected VM being in the ON state to the client 6100.

As described above, in order to allocate a 'multi-VM user' type-VM according to the present invention, the management server 6200 supports the client 6100 so that the client 6100 may select the VM desired to be accessed. The operation performed after the client 6100 selects a VM may be performed by allocating a VM and accessing the VM using the same method as the above-described method of the allocated user type.

Meanwhile, in the case of the allocated user type and the multi-VM user type, only a user previously registered as a user may create his or her VM on the client. The client 6100 creates a VM by inputting information about the name of the VM to be used thereby, the number of CPUs, the size of memory, the size of storage space, and the OS to be used. The above-described function may be requested by the manager rather than the user, and the requested information may be executed by the manager in local space using a management tool.

Figure 18:
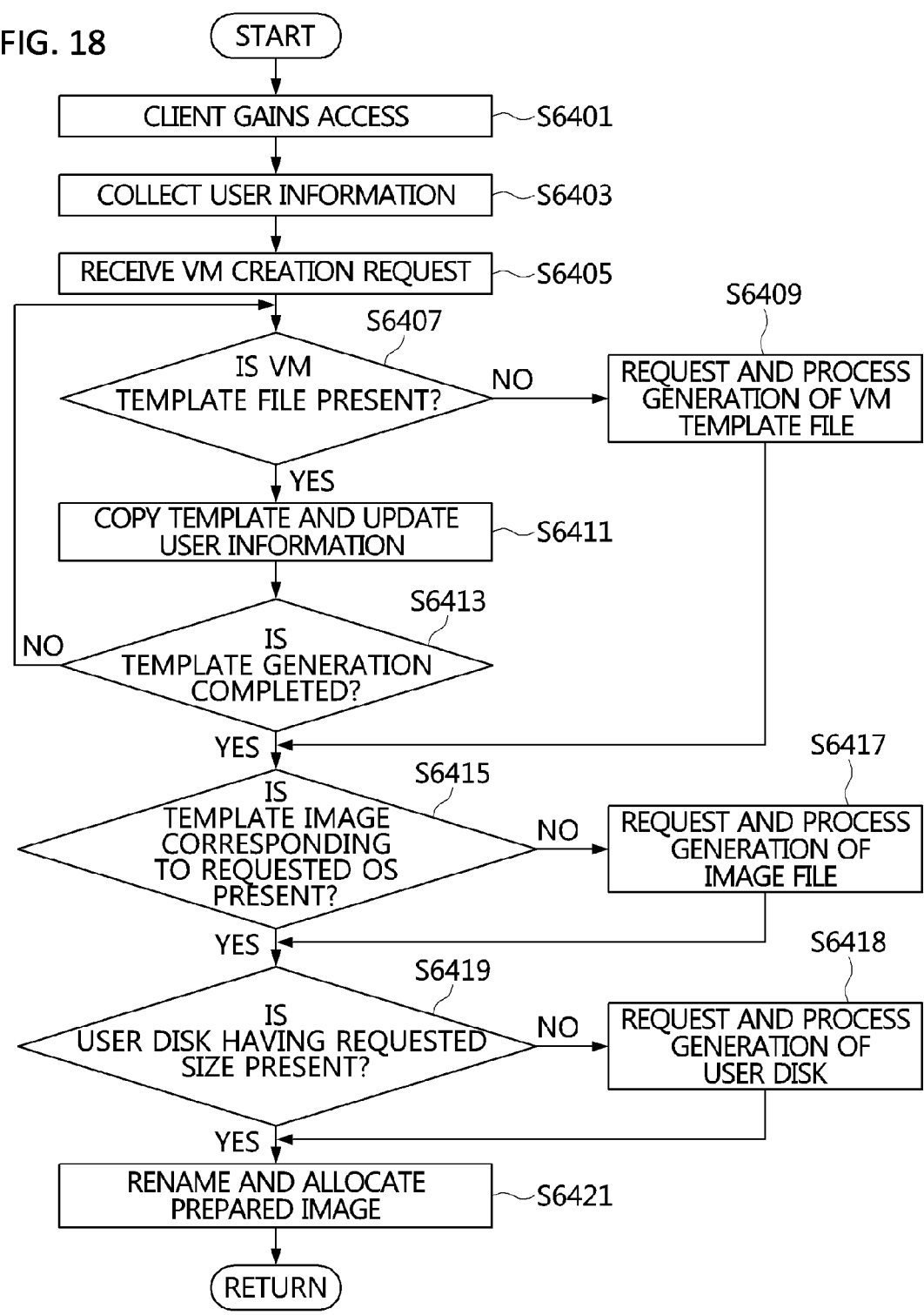
FIG. 18 is a flowchart showing a method for creating a virtual machine at the request of a user.

FIG. 18 is a diagram illustrating a method for creating a VM in response to a user request.

Referring to FIG. 18, the client 6100 accesses the management server 6200 at step S6401, and may request VM information from the management server 6200. The management server 6200 may collect user information input by the client 6100 at step S6403, and may receive a VM creation request at step S6405. Here, the user information may be information about resources and an OS to be used in the VM. The management server 6200 may transmit a VM creation request to the operation server 6300 using the user information, and the operation server 6300 may generate a VM template file. In this procedure, the operation server 6300 may check whether there is a VM template file corresponding to the user information at step S6407. Here, if there is no VM template file, the process may branch to the step S6409 of requesting and processing the generation of a VM template file.

When the VM template file generation request is transmitted to the client 6100, the client 6100 may perform a procedure for generating a VM template file in response to the VM template file generation request. The VM template file is a file in which the attributes of VMs that are used are stored, and may be serviced only when a golden template file, preset by the manager, is present. If there is no preset golden template file, the client 6100 may be supported so that a VM template file is generated using a template generator, and tasks related to the VM creation request may be temporarily stopped until the golden template file is generated. When there is a VM template file at step S6407, the process of the operation server 6300 may proceed to the step S6411 of copying the template and updating the user information. Thereafter, the operation server 6300 may determine whether the generation of the template has been completed at step S6413, and may return to a procedure prior to step S6407 when the generation of the template is not completed.

When the generation of the VM template file is completed at step S6413, the operation server 6300 allocates the OS image and user disk of the client 6100, and checks whether a previously generated template image is present at step S6415. At this step, when there is no template image corresponding to the OS requested by the client 6100, the process branches to the step S6417 of requesting the generation of a template image from the client 6100 and processing the generation of the template image. Here, in order to generate the template image, the generation of a file using an image generator is requested, and the current task is temporarily stopped. At step S6415, when there is a template image, whether a user disk having the size requested by the client 6100 is present may be determined at step 6419. When there is no such user disk, the generation of a user disk image may be requested from the client 6100 and the generation of the user disk image may be processed at step S6417. When a template image and a user disk are present, the operation server 6300 may rename the template file according to the name set in the template file and allocate the renamed template file to the client 6100 at step S6421, and may also rename the user disk using the same method.

Meanwhile, the template image generation request and the user disk image generation request in the aforementioned process may be processed under the control of the operation server 6300 or under the control of the management server 6200. When the template image generation request and the user disk image generation request are processed under the control of the management server 6200, the operation server 6300 may transmit the image generation request to the client 6100 through the management server 6200, and the client 6100 may process the image generation request through the management server 6200. Alternatively, when the operation server 6300 is designed to establish a communication channel with the client 6100 and support the transmission and processing of an image generation request, the client 6100 may also process the image generation request through the operation server 6300.

Meanwhile, to establish the above-described VM creation flow, the manager prepares a template file for service in advance and allows the template file to be recognized by the system.

The OS image and disk image of the user may be provided in response to a generation request received from the client 6100 in the state in which they are prepared in advance. For this operation, the client 6100 may generate the OS image and the user disk image in advance using a template file generator and an image generator. Accordingly, a basic golden template file and a basic golden image file may be generated and stored before VMs are allocated, and may be used to operate the system. The golden image file and the golden template file implemented in this way may be provided in real time when they are requested by the client 6100, and may be used to simply copy and reconfigure template files, to previously copy template images, to maintain a specific number of template images, and to rename the template images.

Since the size of a template file is not large, a method for simply copying the template file may be adopted. However, since an OS image has a large size, it is efficient to use a method for driving an image generator and setting, in advance, OS images and user disk images, which are to be provided when being requested, in order to request OS images from a VM in real time.

Figure 19:
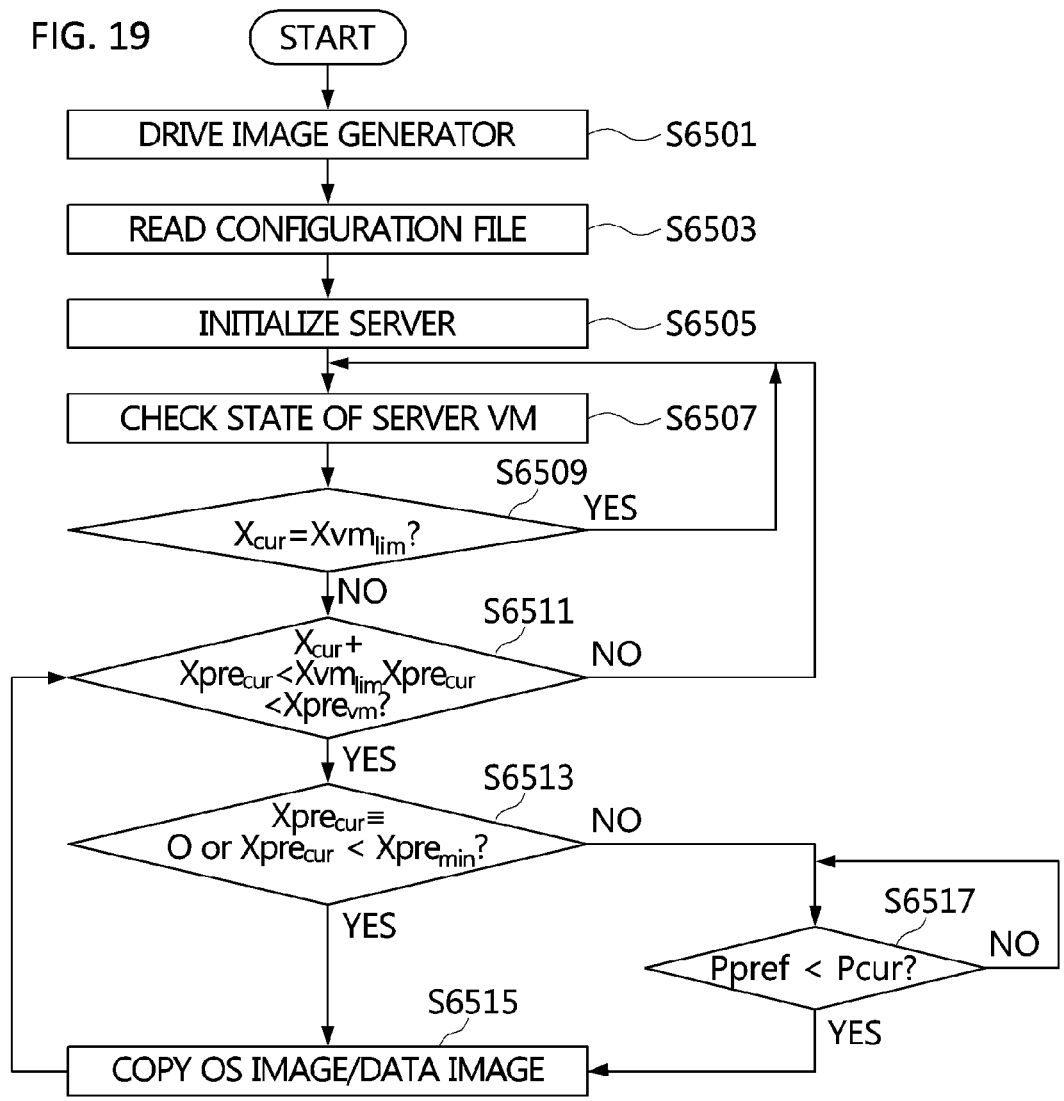
FIG. 19 is a flowchart showing the operation of an image generator according to the present invention.

FIG. 19 is a flowchart showing the operation of an image generator according to the present invention.

Referring to FIG. 19, the operation server 6300 drives an image generator in order to operate the image generator according to the present invention at step S6501. Further, the operation server 6300 may read a configuration file at step S6503. As the values of an initial configuration file, the values of $Xvm_{limit}$ and $Xpre_{vm}$, the type of OS that is used, and the positions of a golden image file and a golden template file may be fetched.

Next, the operation server 6300 may perform server initialization at step S6505. In the server initialization task, items related to the configuration file are checked. The operation server 6300 may temporarily stop its operation when neither a golden image file nor a golden template file is present. Thereafter, the operation server 6300 may check the states of server VMs at step S6507. The operation server 6300 may check whether the number of current VMs (Xcur) is identical to the maximum number of images ($Xvm_{limit}$) that can be installed per operation server at step S6509. That is, when the above-described initialization task is performed, the operation server 6300 checks the number of current VMs (Xcur) and determines whether the number of current VMs (Xcur) is identical to $Xvm_{limit}$. When the values are identical to each other, no more VMs can be installed in the corresponding operation server, and thus the process returns to the procedure prior to step S6507, where the states of the server VMs are continuously checked.

Meanwhile, when Xcur is not identical to $Xvm_{limit}$ at step S6509, the operation server 6300 may determine whether the condition given in the following Equation (1) is satisfied at step S6511.

$$Xcur + Xpre_{cur} < Xvm_{lim} Xpre_{cur} < Xpre_{vm} \tag{1}$$

In Equation (1), Xcur denotes the total number of current VMs, $Xpre_{cur}$ denotes the number of VMs that are currently prepared, $Xvm_{limit}$ denotes the number of images that can be installed per operation server, and $Xpre_{vm}$ denotes the maximum number of images that can be maintained per operation server.

When the condition of $Xvm_{lim}Xpre_{cur}$ is not satisfied at step S6509, the process of the operation server 6300 may return to the procedure prior to the step S6507 of controlling the process such that the subsequent procedure is performed again. Further, when the above condition is satisfied at step S6509, the process of the operation server 6300 may branch to the step S6513 of determining whether the following Equation (2) is satisfied.

$$Xpre_{cur} = O \text{ or } Xpre_{cur} < Xpre_{min} \quad (2)$$

In Equation (2), $Xpre_{cur}$ denotes the number of VMs that are currently prepared, and $Xpre_{min}$ denotes the minimum number of images that can be maintained per operation server.

When the condition stated at step S6513 is satisfied, the operation server 6300 may copy OS images and data images at step S6515. Thereafter, the process of the operation server 6300 may return to the step S6511 of determining whether the corresponding condition is satisfied. In contrast, when the corresponding condition is not satisfied at step S6513, the process of the operation server 6300 may branch to the step S6517 of determining whether an availability value Ppref, by which the operation server may be operated, is lower than a server availability value Pcur. That is, the operation server 6300 checks a measured server power consumption value or a server availability value, and copies images after waiting until the availability value Pref becomes lower than Pcur. Such an operation is a method for improving the utilization of CPUs attributable to the copying of the servers.

Meanwhile, although the driving of the image generator has been described as being performed by the operation server 6300, the present invention is not limited thereto. That is, the image generator may be provided by the management server 6200 to the client 6100, may support the generation of OS images and user disk images, and may then support the storage of images such that the OS images and user disk images are stored in the shared storage 6400, either directly or through the operation server 6300. The management server 6200 and the operation server 6300 may manage information about the positions of the OS images and the user disk images stored in the shared storage 6400 for respective clients in order to provide VMs.

As described above, the method and system for providing server VMs and the apparatus supporting the method according to the embodiments of the present invention may support the provision of different types of VMs depending on the user terminal registration information or the type of user terminal, previously registered by the client 6100, corresponding to the user terminal. Such an operation may consequently support the provision of images so that user OS images and user disk images to be allocated to the client 6100 can be provided within a short period of time, and may improve the speed of VM allocation. Also, since the present invention allocates prepared image files, the number of operations such as the creation of VMs or copying of images is minimized, and thus a server load may be minimized.

The virtual desktop provision method and server according to the present invention relate to lightweight protocol technology for satisfactorily supporting virtual desktop service even in a place where the network environment is poor, and provides a lightweight protocol, to which an image compression engine for reducing the consumption of network bandwidth when a control engine and a screen are transmitted is added, in order to provide virtual desktop service optimized for the access environment of the client terminal.

Further, the virtual desktop provision method and server according to the present invention may provide optimal service by collecting and analyzing network traffic, device specifications, and computing resources of client terminals, thus allowing users to be adaptively provided with optimal virtual desktop service in response to variation in their network conditions or computing resources.

FIG. 20 is a graph showing network loads between a virtual desktop provision server and the client terminal and CPU loads on the virtual desktop provision server for respective application programs.

FIG. 20 illustrates a graph showing network loads between the virtual desktop provision server and the client terminal and CPU loads on the virtual desktop provision server for respective application programs, that is, respective types of tasks. Referring to FIG. 20, when the client terminal performs a task using a normal office application program on a virtual desktop, the network load and server CPU load are small. In contrast, when the client terminal performs tasks such as web surfing or video playing (streaming) on the virtual desktop, the network load and the server CPU load may greatly increase. That is, tasks that cause frequent screen transition increase the network load and the server CPU load. In the place where a network environment is poor, a problem may arise in that, when the client terminal requests tasks that increase the network load and the server CPU load from the virtual desktop, the client terminal cannot use the virtual desktop service as desired.

Figure 21:
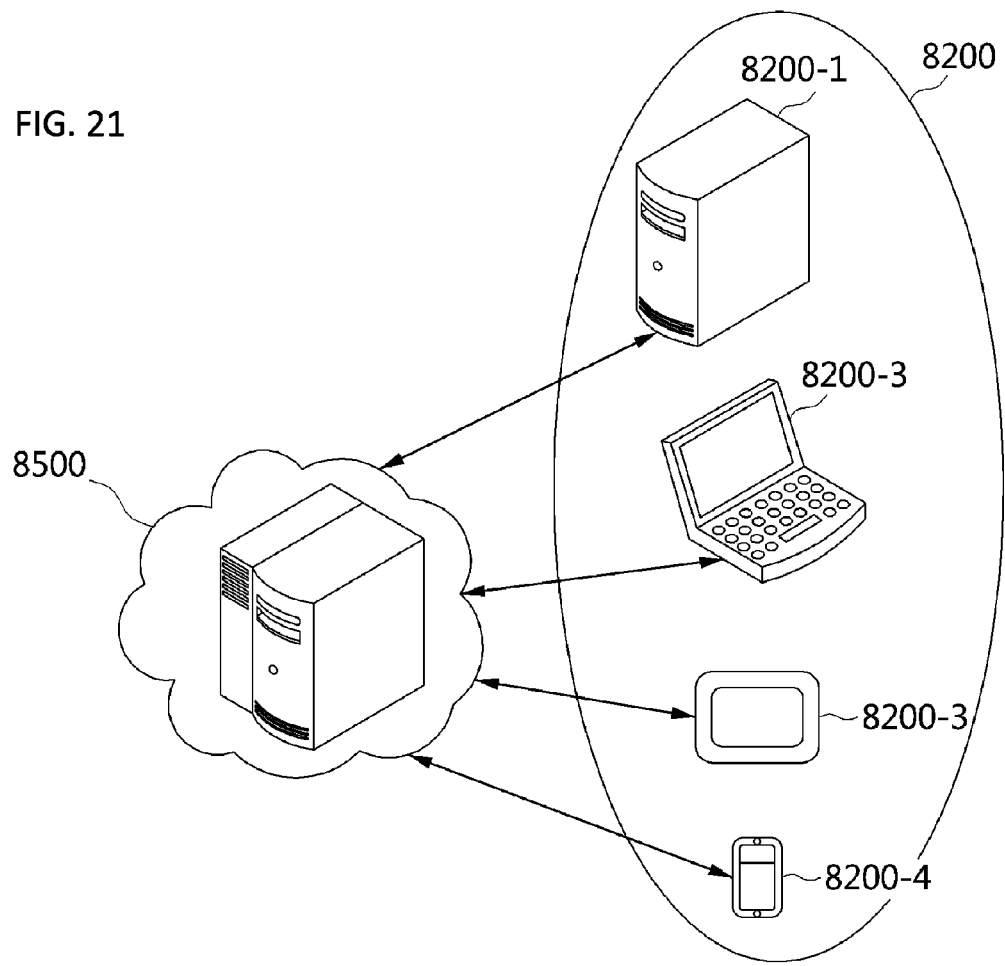
FIG. 21 is a diagram showing a virtual desktop service environment.

FIG. 21 is a diagram showing a virtual desktop service environment.

Referring to FIG. 21, in the virtual desktop service environment, respective terminals 200-1,200-2, 200-3, and 200-4 of users are connected to a virtual desktop provision server 8500 over a network, such as a Wide Area Network (WAN) or a Local Area Network (LAN). In an embodiment, respective users may use virtual desktops for terminals, such as a PC, a notebook computer, a tablet, and a smart phone used by the users, by connecting the terminals to a virtual desktop provision server 8500. Here, the respective terminals act as client terminals that use virtual desktops.

A virtual platform pool generates a virtual platform by tightly coupling virtual hardware resources of a virtualization server to software images (user profiles, applications, or OSs), and provides the generated virtual platform to the user via a virtual platform delivery protocol. A function of running multiple applications, provided by the virtual platform, provides an environment in which respective OS-based application programs are executed in the virtual platform.

When the virtual desktop service is provided, the virtual protocol is used to receive input through a keyboard, a video device, or a mouse from a control device and a remote computing device over the network, to transmit output to the remote computing device, and to define a set of protocol messages for access. Here, the control device may reside on both the client terminal and a virtual desktop provision server.

Virtual desktop service protocols may be divided into multiple communication channels depending on the sequence of communication sessions and the types of communication channels (where all channels may be remote computing devices). Respective communication channels have the ability to control the execution of messages in correspondence with respective communication channels and the ability to add or remove a communication channel for an execution time. The communication channels may be defined in the following protocol format:

- main channel for functioning to connect a main protocol session
- display channel for causing a remote display to be updated
- input channel for sending mouse and keyboard events
- cursor channel for receiving the shape and position of a pointer
- play channel for receiving audio streams
- recording channel for sending captured audio Below, a client terminal and a virtual desktop provision server, which are operating in the virtual desktop service environment shown in FIG. 21, will be described in detail.

Figure 22:
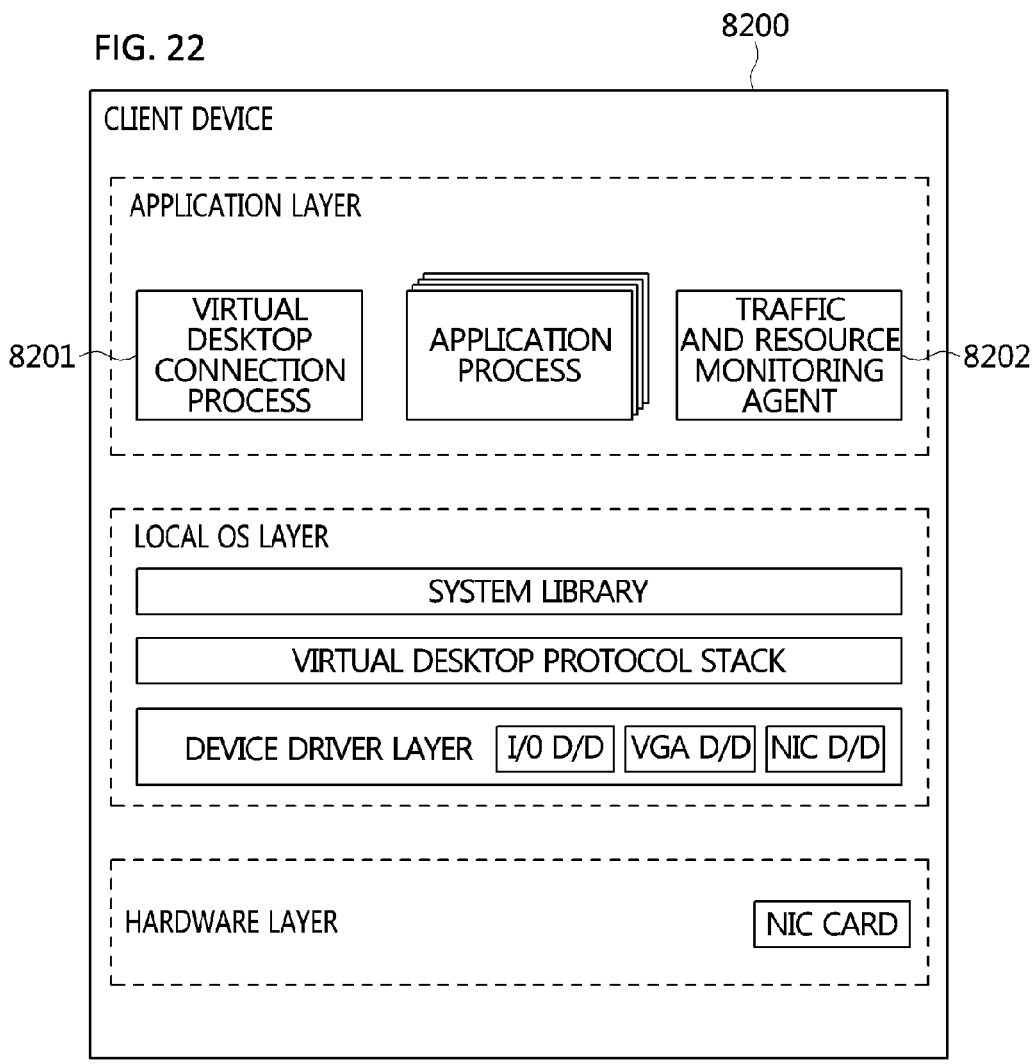
FIG. 22 is a block diagram showing the logical structure of a client terminal according to the present invention.

FIG. 22 is a block diagram showing the logical structure of a client terminal according to the present invention.

Referring to FIG. 22, a client terminal 8200 according to the present invention is connected to the virtual OS of a virtual desktop provision server by executing a virtual desktop connection process 8201 and is provided with virtual desktop service from the virtual desktop provision server.

The client terminal 8200 according to the present invention monitors the states of network traffic, device specifications, and computing resources of the client terminal 8200 through a traffic and resource monitoring agent 8202. The client terminal 8200 may transmit the collected monitored information to the virtual desktop provision server.

In various embodiments of the present invention, the virtual desktop provision server receives information collected through the traffic and resource monitoring agent 8202 and controls the service quality of virtual desktops based on the received information.

Other logical components of the client terminal 8200 shown in FIG. 22 are identical to those of conventional technology, and thus a detailed description thereof will be omitted.

Below, the configuration of the virtual desktop provision server will be described in detail.

Figure 23:
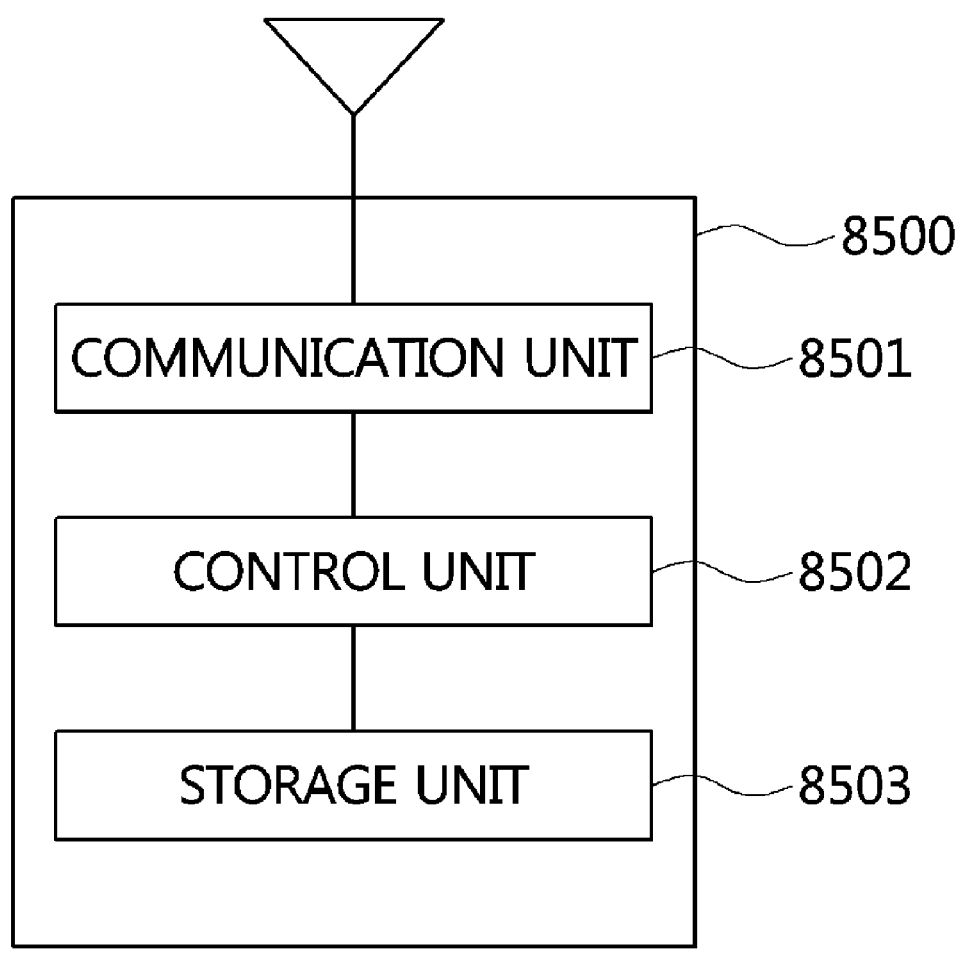
FIG. 23 is a block diagram showing the physical structure of a virtual desktop provision server according to the present invention.

FIG. 23 is a block diagram showing the physical structure of the virtual desktop provision server according to the present invention.

Referring to FIG. 23, a virtual desktop provision server 8500 includes a communication unit 8501, a control unit 8502, and a storage unit 8503.

The communication unit 8501 performs data communication with an external system. In accordance with the present invention, the communication unit 8501 may perform data communication with a client terminal or the virtual desktop management server. The communication unit 8501 may receive information corresponding to at least one of the network traffic, device specifications, and computing resources of the client terminal from the client terminal.

The control unit 8502 may control the overall operation of the virtual desktop provision server 8500. For example, the control unit 8502 may control the service quality of the virtual desktop of the corresponding client terminal based on the information about at least one of the network traffic, device specifications, and computing resources of the client terminal, received through the communication unit 8501. For this, the control unit 8502 may load the source code of at least one program stored in the storage unit 8503.

More specifically, the control unit 8502 monitors the network traffic, device specifications, and computing resources of the virtual desktop provision server 8500, and collects information about network traffic, device specifications, and computing resources. The control unit 8502 may collect such information via monitoring agents provided in the OSs of the virtual desktop provision server 8500 and a virtual desktop.

The control unit 8502 determines environmental parameters for the virtual desktop of the client terminal based on the state information of the client terminal received from the client terminal, and the state information of the virtual desktop provision server 8500. The environmental parameters may include at least one of screen transmission compressibility, screen resolution, image compressibility, audio compressibility, video compressibility, audio codec type, and video codec type.

The control unit 8502 controls the virtual desktop of the corresponding client terminal in consideration of the determined environmental parameters. The control unit 8502 may provide a virtual desktop having quality suitable for the usage environment of the client terminal in consideration of the determined environmental parameters.

The storage unit 8503 may store programs, information, and data required for the operation of the virtual desktop provision server 8500. In accordance with an embodiment of the present invention, the storage unit 8503 may store information about the states of the network traffic, device specifications, and computing resources of the client terminal.

Further, the storage unit 8503 may store the environmental parameters (e.g. screen transmission compressibility, screen resolution, image compressibility, audio compressibility, video compressibility, audio codec type, or video codec type) of the virtual desktop of at least one client terminal, set by the control unit 8502.

Below, the operation of the virtual desktop provision server 8500 will be described based on a logical structure.

Figure 24:
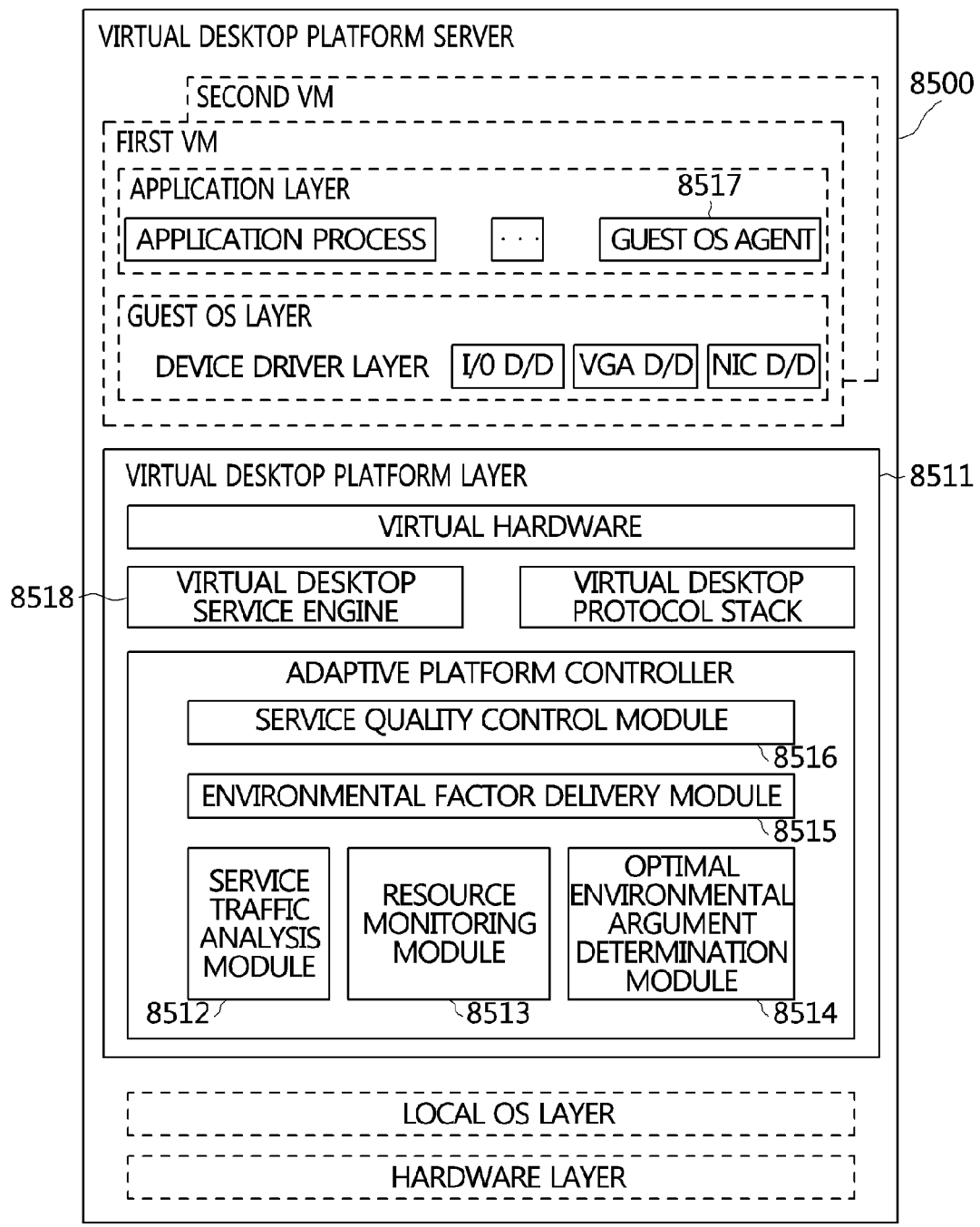
FIG. 24 is a block diagram showing the logical structure of the virtual desktop provision server according to the present invention.

FIG. 24 is a block diagram showing the logical structure of the virtual desktop provision server according to the present invention. FIG. 24 illustrates the principal functions of a virtual desktop provision server when the client terminal of the virtual desktop accesses the virtual desktop provision server over a network and uses virtual desktop service. In various embodiments, the virtual desktop provision server may also be referred to as a 'virtual desktop platform provision server', 'virtual desktop central server', or the like.

Referring to FIG. 24, the virtual desktop provision server 8500 provides dynamic lightweight protocol-based adaptive virtual platform service in order to provide desirable virtual desktop service even in a client terminal in an environment in which the network situation or computing situation is poor. For this, both a traffic analysis module for monitoring and analyzing the states of network traffic, device specifications, and computing resources of the terminal and the states of network traffic, device specifications, and computing resources of the virtual desktop provision server 8500, and a lightweight protocol for utilizing the interface of the traffic analysis module are applied to the virtual desktop provision server 8500. The lightweight protocol takes charge of monitoring of the performance and network state of the client terminal in order to provide service optimized for the client terminal. The virtual desktop provision server 8500 sets the environmental parameters of a virtual desktop optimized for the client terminal based on the lightweight protocol. The virtual desktop provision server 8500 may provide adaptive virtual platform service to the client terminal when a lightweight protocol optimization system is stably supported.

Referring to FIG. 24, the virtual desktop provision server 8500 includes a virtual desktop platform layer 8511.

In an embodiment of the present invention, the virtual desktop platform layer 8511 is configured to include a service traffic analysis module 8512 and a resource monitoring module 8513. The service traffic analysis module 8512 monitors network traffic and collects information through monitoring agents for a client terminal, the virtual desktop provision server 8500, and the guest OS 8517 of a virtual desktop. The resource monitoring module 8513 monitors computing resources and collects information through the monitoring agents for the client terminal, the virtual desktop provision server 8500, and the guest OS 8517 of the virtual desktop.

An optimal environmental parameter determination module 8514 is a module for determining the environmental parameters of a platform in order to provide optimal service in the virtual platform, and is configured to analyze collected state information through the service traffic analysis module 8512 and the resource monitoring module 8513 and determine the environmental parameters of the virtual desktops to be provided to respective client terminals. The optimal environmental parameters corresponding to the state information of the client terminal and the virtual desktop provision server may be determined based on a mapping table or preset rules. Determination methods or conditions in the present invention are not especially limited.

However, when network traffic is high or computing resources are insufficient, it may be general to set transmission compressibility to a high value and set screen resolution to a low value. The optimal environmental parameter determination module 8514 may collect and manage traffic analysis data and computing resource analysis data depending on the types of various virtual platform services in order to determine optimal environmental parameters.

An environmental parameter delivery module 8515 delivers the environmental parameters, determined by the optimal environmental parameter determination module 8514, to the service quality control module 8516. The service quality control module 8516 controls the quality of the virtual desktop service by actually applying the environmental parameters to the virtual desktop. In accordance with the above-described embodiment of the present invention, the environmental parameters are dynamically changed based on the information collected via the analysis of specifications, computing resources, and network traffic of the client terminal.

A virtual desktop service engine 8518 controls adaptive virtual platform service based on the delivered environmental parameters. The virtual desktop service engine 8518 may provide optimal service adapted for the network environment or computing resources of the client terminal by dynamically changing the video compressibility, screen resolution, or the like of the application program running on the guest OS 8517 under the control of the service quality control module 8516.

Other logical components of the virtual desktop provision server 8500 shown in FIG. 24 are identical to those in the conventional technology, and thus a detailed description thereof will be omitted.

Figure 25:
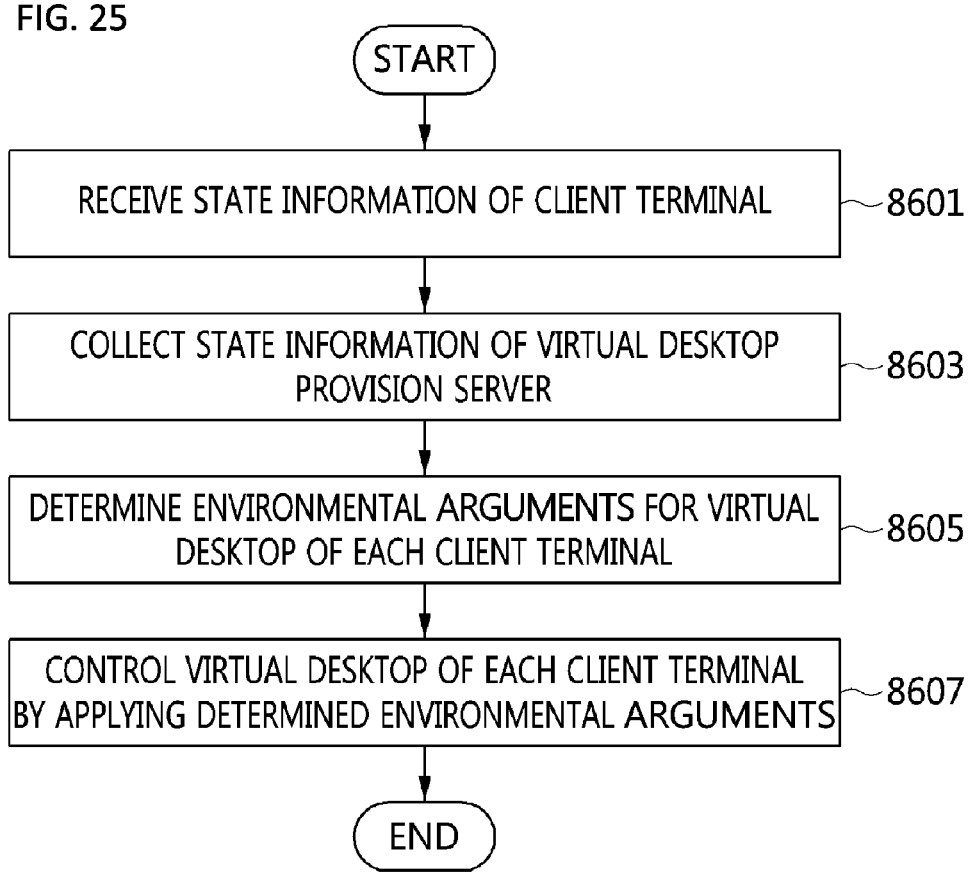
FIG. 25 is a flowchart showing a virtual desktop provision method according to the present invention.

FIG. 25 is a flowchart showing a virtual desktop provision method according to the present invention.

Referring to FIG. 25, the virtual desktop provision server receives information about the state of each client terminal from the client terminal at step 8601. The state information of the client terminal is collected by a monitoring agent provided in the client terminal, and may include information about at least one of network traffic, device specifications, and computing resources of the client terminal.

The virtual desktop provision server monitors the state of the virtual desktop provision server and collects information about the state at step 8603. The state information of the virtual desktop provision server may be collected by monitoring agents provided in the virtual desktop provision server and the OS of a virtual desktop, and may include information about at least one of network traffic, device specifications, and computing resources of the virtual desktop provision server.

The virtual desktop provision server determines environmental parameters for the virtual desktop of the client terminal based on the state information of the client terminal and the state information of the virtual desktop provision server at step 8605. The virtual desktop provision server may determine the optimal environmental parameters for the virtual desktop used by each client terminal by analyzing the collected information. The environmental parameters may include at least one of screen transmission compressibility, screen resolution, image compressibility, audio compressibility, video compressibility, audio codec type, and video codec type.

The virtual desktop provision server controls the virtual desktop of the client terminal by applying the determined environmental parameters to the client terminal at step 8607.

The virtual desktop provision method and server according to the present invention relate to lightweight protocol technology for desirably supporting virtual desktop service even in a place where the network environment is poor, and provides a lightweight protocol, to which an image compression engine for reducing the consumption of network bandwidth when a control engine and a screen are transmitted is added, in order to provide virtual desktop service optimized for the access environment of the client terminal.

Further, the virtual desktop provision method and server according to the present invention may provide optimal service by collecting and analyzing network traffic, device specifications, and computing resources of client terminals, thus allowing users to be adaptively provided with optimal virtual desktop service in response to variation in their network conditions or computing resources.

As described above, in accordance with the present invention, there is an advantage in that architecture that is capable of efficiently providing virtual desktop service may be provided.

In accordance with the present invention, a DaaS system including a virtual desktop manager and a client device is used, thus enabling the DaaS system to be efficiently managed using a multi-PC system based on desktop virtualization, to be easily applied to systems, and to be applied even to existing virtualization systems.

Figure 26:
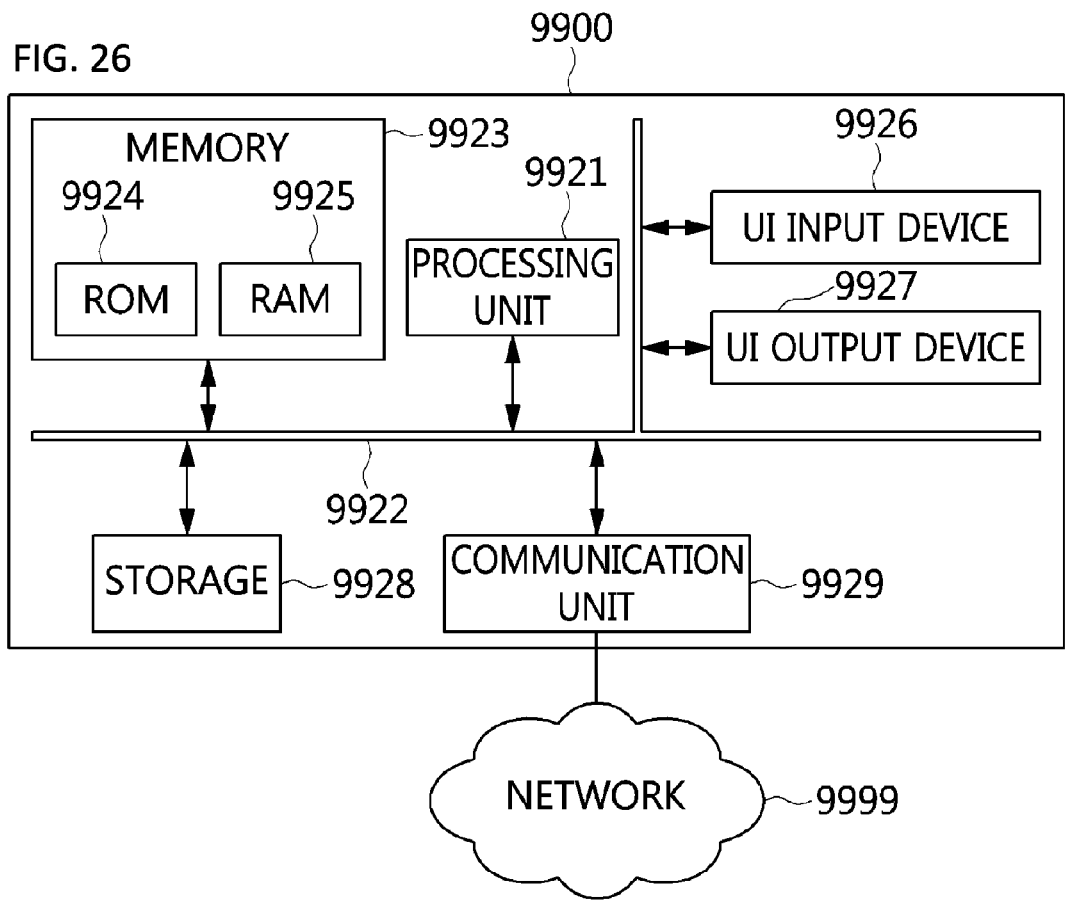
FIG. 26 illustrates a computer that implements an apparatus, a device or a server according to an example.

FIG. 26 illustrates a computer that implements an apparatus, a device or a server according to an example.

As shown in FIG. 26, computer 9900 may include a processing unit 9921, memory 9923, a UI input device 9926, a UI output device 9927, storage 9928 and a communication unit 9929, which communicate with each other through a bus 9922.

The processing unit 9921 may include at least one processor and/or at least one processing core. The processing unit 9921 may be a semiconductor device for executing processing instructions stored in the memory 9923 or the storage 9928. The processing unit 9921 may process tasks required for the operation of the computer 9900. The processing unit 9921 may execute codes in the operations or steps of the processing unit 9921 which will be described in the embodiments.

The processing unit 9921 may generate or process information and/or data used for the operation of the apparatus, the device or the server in the embodiments. And, the processing unit 9921 may process a determination, a comparison and a analysis on information and/or data used for the operation of the apparatus, the device or the server in the embodiments.

Each of the memory 9923 and the storage 9928 may be any of various types of volatile or nonvolatile storage media. For example, the memory may include at least one of ROM 9924 and RAM 9925. The memory 9923 and the storage 9928 may store information, data and/or code required for the operation of the electronic device 9900. The storage 9928 may include a DataBase.

The UI input device 9926 may be a touch screen, a keyboard and/or a mouse.

The UI output device 9927 may be a display.

The electronic device 9900 may further include a communication unit 9929 connected to a network 9999. For example, the communication unit 9929 may be a network chip or port.

The communication unit 9929 may receive information and/or data required for the operation of the electronic device 9900 from other apparatus, other device or other server. And the communication unit may transmit information and/or data required for the operation of the electronic device 9900 to the other apparatus, the other device or the other server.

The communication unit 9929 may transmit information and/or data to the other apparatus, the other device or the other server in the network 9999 and may receive information and/or data from the other apparatus, the other device or the other server.

Programs may be stored in the memory 9923 in the form of system programs, applications, or other programs. Also, at least some parts of at least one program may be stored in remote memory, which may communicate with the electronic device 9900.

The above-mentioned embodiments according to the present invention may be implemented as program instructions that can be executed by various computer means. In this case, the program instructions may be recorded on a computer-readable storage medium. The computer-readable storage medium may include program instructions, data files, and data structures, either solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as CDROM and a DVD, magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

There is provided a method and apparatus that may protect an operating system against malware and detect malware attacks by verifying the integrity of the operating system and detecting threats to the operating system.

There is provided a method and apparatus that may reduce the overhead associated with the use of virtualization technology by using a lightweight hypervisor.

There is provided a method and apparatus that may avoid performance degradation in a virtualized operating system by using a lightweight hypervisor.

There is provided a method and apparatus for detecting a method in which malware alters an operating system and detecting the characteristics of such alteration by using an operating system monitor.

There is provided a method and apparatus that may avoid degradation of the performance of a virtual machine compared to the performance of a physical machine by making full use of the performance of the physical machine in which a processor that includes multiple processing units is installed.

Although the present invention has been described above in connection with specific items, such as detailed elements, limited embodiments, and the drawings, they are provided to help the general understanding of the present invention, and the present invention is not limited to the above embodiments. Those skilled in the art can modify the present invention in various ways from the above description.

Accordingly, the scope of the present invention should not be limited to the above-described embodiments, but should be defined within the scope of the appended claims and equivalents thereof.

What is claimed is:

1. An apparatus for virtual desktop service, comprising:
   a processor to perform an assignment task of assigning a virtual machine to a user terminal using the virtual desktop service,
   wherein software resources including an operating system, applications, and user profiles ace provided to the virtual desktop service, and
   wherein hardware resources are supported for the virtual desktop service,
   wherein the processor performs a delivery function for a delivery protocol, and the delivery function provides a communication channel between the apparatus and the user terminal;
   wherein the delivery function determines a connection result based on environmental parameters for the virtual desktop service received from the user terminal,
   wherein the environmental parameters include a screen resolution, a compression rate of video and audio, and a kind of video and audio codec,
   wherein the processor further performs connection management function,
   wherein the connection management function identifies a first type of user, a second type of user or a third type of user from the user terminal,
   wherein the processor persistently allocates a permanent virtual machine by adopting a pre-set method and a manual method to the first type of user,
   wherein the processor allocates a non-persistent virtual machine for one time use to the second type of user,
   wherein when an access of the second type of user is released, a personal profile of the second type of user is not stored, and
   wherein the processor allocates multiple virtual machines to the third type of user.

2. The apparatus of claim 1, wherein the processor provides environment files with the user terminal, the environment files including an image of operating system (OS)

which corresponds to a requirement configured by the user terminal, and wherein the environmental files are prepared in advance when the virtual desktop service is provided.

3. The apparatus of claim 2, wherein a plurality of virtual machines in the servers is generated over a single hypervisor.

4. The apparatus of claim 3, wherein the delivery protocol is used to encapsulate and deliver access to an entire information system environment or access to the user terminal over a network.

5. A virtual desktop service method, comprising:
checking, by a connection manager, user profiles of a user terminal for virtual desktop service and searching for a virtual machine suitable for hardware of the user terminal;
requesting, by the connection manager, a virtual machine infrastructure to generate a corresponding virtual machine if the suitable virtual machine is not present and applying, by the connection manager, the user profiles to a corresponding virtual machine if the suitable virtual machine is present and generating a virtual desktop; and
sending, by the connection manager, connection information for sending the generated virtual desktop to the user terminal and sending the virtual desktop to the user terminal using a delivery protocol of the virtual desktop,
wherein the connection manager performs a delivery function for a delivery protocol, and the delivery function provides a communication channel between the connection manager and the user terminal;
wherein the delivery function determines a connection result based on environmental parameters for the virtual desktop service received from the user terminal, and
wherein the environmental parameters include a screen resolution, a compression rate of video and audio, and a kind of video and audio codec, and
wherein the connection manager further performs connection management function,
wherein the connection management function identifies a first type of user, a second type of user or a third type of user from the user terminal,
wherein the connection manager persistently allocates a permanent virtual machine by adopting a pre-set method and a manual method to the first type of user,
wherein the connection manager allocates a non-persistent virtual machine for one time use to the second type of user,
wherein when an access of the second type of user is released, a personal profile of the second type of user is not stored, and
wherein the connection manager allocates multiple virtual machines to the third type of user.

6. The method of claim 5, wherein the connection manager provides environment files with the user terminal, the environment files including an image of operating system (OS) which corresponds to a requirement configured by the user terminal, and wherein the environmental files are prepared in advance when the virtual desktop service is provided.

7. The method of claim 6, wherein a plurality of virtual machines in the servers is generated over a single hypervisor.

8. The method of claim 7, wherein the delivery protocol is used to encapsulate and deliver access to an entire information system environment or access to the user terminal over a network.

* * * * *